(12) United States Patent
Okahara et al.

(10) Patent No.: US 11,494,934 B2
(45) Date of Patent: Nov. 8, 2022

(54) IMAGE PROCESSING DEVICE, IMAGE PROCESSING METHOD, AND MONITORING SYSTEM

(71) Applicant: MITSUBISHI ELECTRIC CORPORATION, Tokyo (JP)

(72) Inventors: Kohei Okahara, Tokyo (JP); Ichiro Furuki, Tokyo (JP); Tsukasa Fukasawa, Tokyo (JP); Kento Yamazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 16/978,941

(22) PCT Filed: Mar. 29, 2018

(86) PCT No.: PCT/JP2018/013113
§ 371 (c)(1),
(2) Date: Sep. 8, 2020

(87) PCT Pub. No.: WO2019/186860
PCT Pub. Date: Oct. 3, 2019

(65) Prior Publication Data
US 2021/0056723 A1 Feb. 25, 2021

(51) Int. Cl.
*G06T 5/00* (2006.01)
*G06T 7/73* (2017.01)
(Continued)

(52) U.S. Cl.
CPC ............ *G06T 7/73* (2017.01); *G06T 5/004* (2013.01); *G06T 5/50* (2013.01); *G06T 7/194* (2017.01);
(Continued)

(58) Field of Classification Search
CPC ... G06T 7/73; G06T 7/194; G06T 7/11; G06T 5/004; G06T 5/50; G06T 2207/30261;
(Continued)

(56) References Cited

U.S. PATENT DOCUMENTS

2004/0264806 A1 12/2004 Herley
2009/0028440 A1* 1/2009 Elangovan ............. H04N 5/265
382/103

(Continued)

FOREIGN PATENT DOCUMENTS

EP 2056256 A2 6/2009
EP 2884460 A1 6/2015
(Continued)

OTHER PUBLICATIONS

British Office Action for British Application No. GB2015095.9, dated Oct. 29, 2021.
(Continued)

*Primary Examiner* — Matthew C Bella
*Assistant Examiner* — Kathleen M Broughton
(74) *Attorney, Agent, or Firm* — Birch, Stewart, Kolasch & Birch, LLP

(57) ABSTRACT

An image processing device includes: a reception unit that receives at least one first image provided from at least one first camera capturing an image of a region in which an object exists and a plurality of second images provided from a plurality of second cameras capturing images of a region including a dead region hidden by the object and invisible from a position of the first camera; and an image processing unit that generates a complementary image, as an image of a mask region in the at least one first image corresponding to the object, from the plurality of second images and generates a synthetic display image by combining the at least one first image and the complementary image.

6 Claims, 26 Drawing Sheets

(51) Int. Cl.
*G06T 7/194* (2017.01)
*G06T 5/50* (2006.01)
*G06V 20/58* (2022.01)

(52) U.S. Cl.
CPC .... *G06V 20/58* (2022.01); *G06T 2207/30261* (2013.01)

(58) Field of Classification Search
CPC . G06T 2207/20221; G06T 11/60; G06T 3/00; G06V 20/58; G06V 20/52; G06V 10/16; G06K 9/6289; H04N 7/181; H04N 7/18
See application file for complete search history.

(56) References Cited

U.S. PATENT DOCUMENTS

| | | | | |
|---|---|---|---|---|
| 2009/0116732 | A1* | 5/2009 | Zhou | H04N 13/261 348/42 |
| 2009/0315978 | A1* | 12/2009 | Wurmlin | G06T 5/005 348/E13.001 |
| 2011/0050864 | A1* | 3/2011 | Bond | H04N 13/261 348/42 |
| 2014/0288413 | A1 | 9/2014 | Hwang et al. | |
| 2016/0028968 | A1* | 1/2016 | Affaticati | H04N 5/2723 348/47 |
| 2017/0084001 | A1 | 3/2017 | Holzer et al. | |

FOREIGN PATENT DOCUMENTS

| | | |
|---|---|---|
| JP | 3-60989 A | 3/1991 |
| JP | 2009-55332 A | 3/2009 |
| JP | 2010-131751 A | 6/2010 |
| JP | 4552525 B2 | 9/2010 |
| WO | WO 2014/135910 A1 | 9/2014 |
| WO | WO 2014/145722 A2 | 9/2014 |

OTHER PUBLICATIONS

British Office Action, dated May 27, 2021, for British Application No. GB2015095.9.

\* cited by examiner

IMAGE PROCESSING DEVICE, IMAGE PROCESSING METHOD, AND MONITORING SYSTEM

TECHNICAL FIELD

The present invention relates to an image processing device, an image processing method and a monitoring system that generate a synthetic display image from a first image captured by a first camera and a plurality of second images captured by a plurality of second cameras.

BACKGROUND ART

There has been proposed a device that generates a synthetic display image including an image of a dead region hidden by an object and invisible from a driver of a vehicle by combining a rearview image as a first image captured by a first camera arranged at a viewpoint position of the driver and a dead zone image as a second image captured by a second camera arranged outside the vehicle and displays the synthetic display image (see Patent Reference 1, for example).

PRIOR ART REFERENCE

Patent Reference

Patent Reference 1: Japanese Patent No. 4552525

SUMMARY OF THE INVENTION

Problem to be Solved by the Invention

In the conventional device mentioned above, the optical axis of the first camera and the optical axis of the second camera are both pointed rearward from the vehicle. However, in monitoring systems and the like, the second camera is generally placed at a position apart from a screening object as the object forming the dead region. In this case, the direction of the optical axis of the first camera and the direction of the optical axis of the second camera greatly differ from each other and there is a problem in that major distortion is likely to occur to the image of the dead region in the synthetic display image.

An object of the present invention, which has been made to resolve the above-described problem with the conventional technology, is to provide an image processing device, an image processing method and a monitoring system capable of making a distortion less noticeable in a synthetic display image generated from a first image captured by a first camera and a plurality of second images captured by a plurality of second cameras.

Means for Solving the Problem

An image processing device according to an aspect of the present invention includes: a reception unit that receives at least one first image provided from at least one first camera capturing an image of a region in which an object exists and a plurality of second images provided from a plurality of second cameras capturing images of a region including a dead region hidden by the object and invisible from a position of the first camera; and an image processing unit that generates a complementary image, as an image of a mask region in the at least one first image corresponding to the object, from the plurality of second images and generates a synthetic display image by combining the at least one first image and the complementary image.

A monitoring system according to another aspect of the present invention includes: at least one first camera capturing an image of a region in which an object exists; a plurality of second cameras capturing images of a region including a dead region invisible from a position of the first camera due to the object; a reception unit that receives at least one first image provided from the at least one first camera and a plurality of second images provided from the plurality of second cameras; an image processing unit that generates a complementary image, as an image of a mask region in the at least one first image corresponding to the object, from the plurality of second images and generates a synthetic display image by combining the at least one first image and the complementary image; and a display device that displays an image based on the synthetic display image.

Effect of the Invention

According to the present invention, the distortion can be made less noticeable in the synthetic display image generated from the first image captured by the first camera and the plurality of second images captured by the plurality of second cameras.

MODE FOR CARRYING OUT THE INVENTION

Image processing devices, image processing methods and monitoring systems according to first to ninth embodiments of the present invention will be described below with reference to the accompanying drawings. The following embodiments are just examples and a variety of modifications are possible within the scope of the present invention.

The monitoring system according to each of the first to ninth embodiments includes at least one first camera that captures images of a region in which an object exists, a plurality of second cameras that capture images of a region including a dead region hidden by the object and invisible from the position of the first camera, an image processing device, and a display device such as a liquid crystal monitor. The monitoring system is applicable to, for example, systems for monitoring a public area such as a road, a work area such as a factory, the inside or the outside of a building, and so forth.

The image processing device according to each of the first to ninth embodiments receives at least a piece of first image data (hereinafter "image data" will also be referred to simply as an "image") provided from at least one first camera and a plurality of second images provided from a plurality of second cameras. The first image and the second image may be either still images or motion videos (i.e., videos). The image processing device generates a synthetic display image by generating a complementary image, as an image of a mask region in the at least one first image corresponding to an object, from the plurality of second images (there are also cases where the complementary image is acquired from a storage unit) and combining the at least one first image and the complementary image. The display device displays an image based on the synthetic display image. The image processing device can be a computer that carries out an image processing method according to each embodiment by executing an image processing program.

(1) First Embodiment (1-1) Configuration

Figure 1:
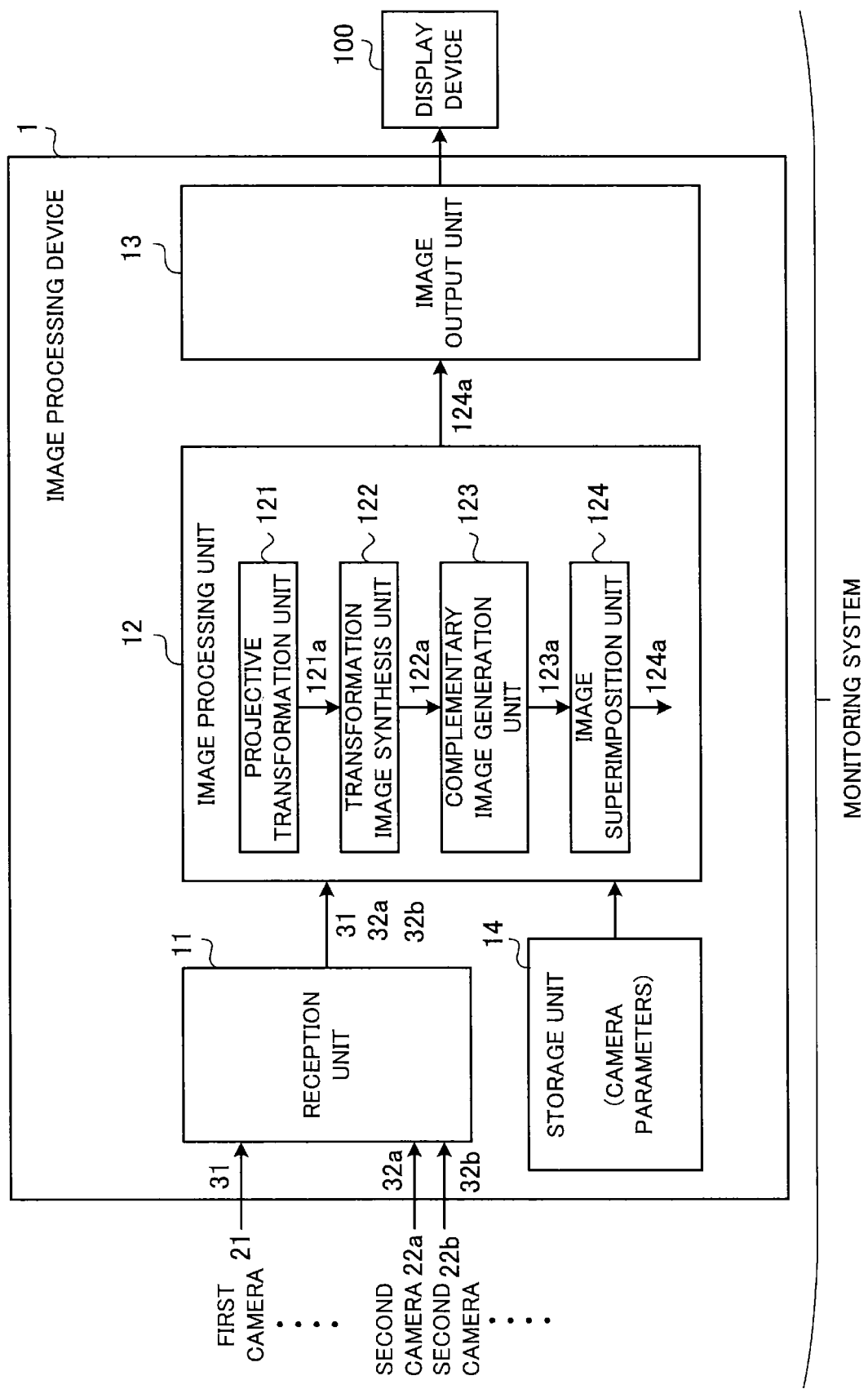
FIG. 1 is a functional block diagram schematically showing an image processing device and a monitoring system according to a first embodiment of the present invention.

FIG. 1 is a functional block diagram schematically showing an image processing device 1 according to a first embodiment. As shown in FIG. 1, a monitoring system includes at least one first camera 21, a plurality of second cameras 22a and 22b, the image processing device 1 and a display device 100. The image processing device 1 includes a reception unit 11, an image processing unit 12, an image output unit 13 and a storage unit 14. The image processing unit 12 includes a projective transformation unit 121, a transformation image synthesis unit 122, a complementary image generation unit 123 and an image superimposition unit 124.

The reception unit 11 is connected to, for example, the first camera 21 and the second cameras 22a and 22b by wire or by radio to be able to communicate with the cameras. The reception unit 11 may communicate with the first camera 21 and the plurality of second cameras 22a and 22b either directly or via a network.

The first camera 21 is, for example, a wide range image capturing camera for capturing an image of a wide image capture region. The first camera 21 is, for example, an image capturing device for capturing a panorama image as an image of a wide range or a bird's eye image as an image as viewed downward from above. The first image 31 outputted from the first camera 21 may be either a still image or a motion video. While one first camera 21 is shown in FIG. 1, it is also possible to arrange a plurality of first cameras 21. Adjacent ones among the plurality of first cameras are arranged to have a common image capture region where their image capture regions overlap with each other. In cases where a plurality of first cameras 21 are connected to the image processing device 1, a synthetic wide range image can be generated by combining a plurality of first images 31 captured by the plurality of first cameras 21. The synthetic wide range image is, for example, a synthetic panorama image or a synthetic bird's eye image obtained by connecting a plurality of images in a horizontal direction, in a vertical direction, or in the horizontal and vertical directions. When an object (referred to also as a "screening object") exists in the common image capture region and the same object is included in each of the plurality of first images 31, there occurs a dead region that is captured by none of the plurality of first cameras 21.

The second cameras 22a and 22b are, for example, narrow range image capturing cameras for capturing an image of an image capture region narrower than that of the first camera 21. The second cameras 22a and 22b are image capturing devices for capturing images of a dead zone, that output second images 32a and 32b by capturing a region including a dead region screened by an object and invisible from the position of the first camera 21. The second images 32a and 32b may be either still images or motion videos. While two second cameras 22a and 22b are shown in FIG. 1, it is also possible to arrange three or more second cameras. Further, the second cameras 22a and 22b may be arranged to have optical axes in directions different from the direction of the optical axis of the first camera 21. For example, the second cameras 22a and 22b may be arranged at positions different from that of the first camera 21 in height.

The first camera 21 and the second cameras 22a and 22b have previously undergone camera calibration. Camera parameter information such as external parameters, internal parameters and lens distortion correction maps obtained by the camera calibration is previously stored in the storage unit 14. The camera calibration is performed also in a state in which the first camera 21 and the second cameras 22a and 22b have been installed. In the camera calibration, it is also possible to use a predetermined marker for calibration.

The projective transformation unit 121 of the image processing unit 12 generates a plurality of projective transformation images (third images) 121a, . . . as viewed from a predetermined position by performing projective transformation on a plurality of second images 32a and 32b. The predetermined position is, for example, the position of the first camera 21, or desired to be a position on the optical axis of the first camera 21.

The transformation image synthesis unit 122 of the image processing unit 12 generates a synthetic projective transformation image (fourth image) 122a by combining the plurality of projective transformation images 121a, . . . . Specifically, the transformation image synthesis unit 122 of the image processing unit 12 generates a complementary image corresponding to the mask region in the first image 31 by performing a blend process (e.g., a blend process, multiband blend process or the like) on partial images of a region common to the plurality of second images 32a and 32b captured by the plurality of second cameras 22a and 22b. Incidentally, an a value used for the a blend is a previously specified value or a value specified by a user through an input device such as a keyboard or a mouse.

The complementary image generation unit 123 of the image processing unit 12 generates a complementary image (fifth image) 123a by extracting an image of a region in the synthetic projective transformation image 122a corresponding to the mask region (i.e., set region corresponding to the object).

The image superimposition unit 124 of the image processing unit 12 generates a synthetic display image 124a by combining the first image 31 and the complementary image 123a. Specifically, the image superimposition unit 124 generates the synthetic display image 124a by superimposing the complementary image 123a on the mask region in one first image 31. Alternatively, the image superimposition unit 124 generates the synthetic display image 124a by superimposing the complementary image 123a on the mask region in each of a plurality of first images 31, . . . and thereafter combining the plurality of first images 31, . . . . Alternatively, the image superimposition unit 124 generates the synthetic display image 124a by superimposing the complementary image 123a on the mask region in a synthetic image (e.g., synthetic panorama image) generated from a plurality of first images 31, . . . . Incidentally, the superimposition can be a blend process (e.g., a blend process) as a synthesis process taking into account the transparency (e.g., a value) of each of two images.

The image output unit 13 outputs the synthetic display image 124a generated by the image processing unit 12 to the display device 100 without change or after converting the signal format. The display device 100 displays a display image including the image of the dead region on a screen.

(1-2) Operation

Figure 2:
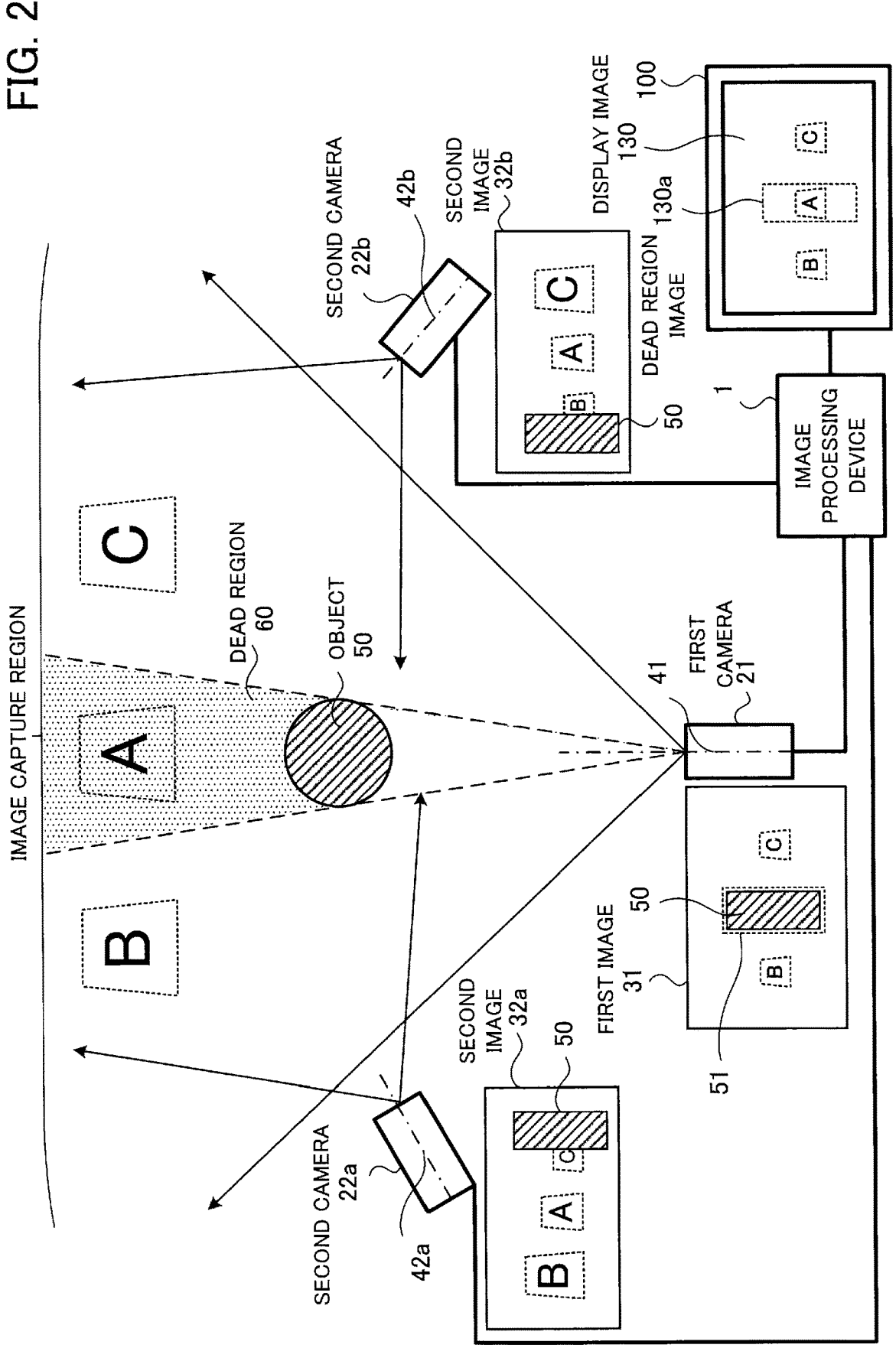
FIG. 2 is an explanatory drawing showing the operation of the image processing device and the monitoring system according to the first embodiment.
Figure 3:
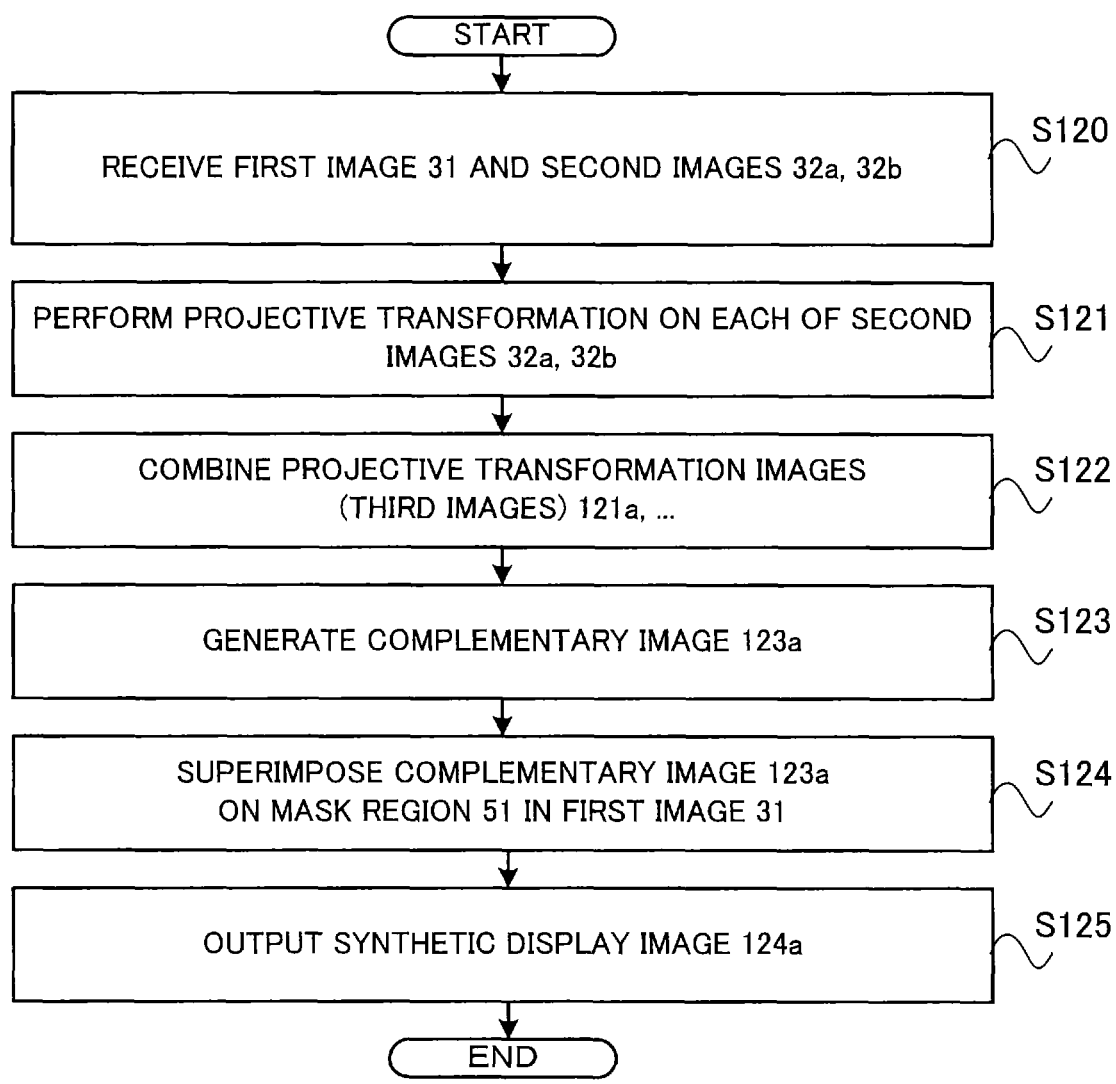
FIG. 3 is a flowchart showing an operation example of the image processing device according to the first embodiment.

FIG. 2 is an explanatory drawing showing the operation of the image processing device 1 and the monitoring system according to the first embodiment. FIG. 3 is a flowchart showing an operation example of the image processing device 1 according to the first embodiment.

First, in step S120, the reception unit 11 of the image processing device 1 receives the first image 31 provided from the first camera 21 that captures an image of a region in which an object 50 exists. Further, the reception unit 11 receives the second images 32a and 32b provided from the second cameras 22a and 22b that capture images of a region including a dead region 60 hidden by the object 50 and invisible from the position of the first camera 21.

In the next step S121, the projective transformation unit 121 of the image processing unit 12 generates two projective transformation images (third images) 121a, . . . as viewed from a predetermined position by performing the projective transformation on each of the second images 32a and 32b. The predetermined position is, for example, the position of the first camera 21, or desired to be a position on the optical axis of the first camera 21.

In the next step S122, the transformation image synthesis unit 122 of the image processing unit 12 generates the synthetic projective transformation image (fourth image) 122a by combining the two projective transformation images 121a, . . . .

In the next step S123, the complementary image generation unit 123 of the image processing unit 12 generates the complementary image (fifth image) 123a by extracting an image of a region in the synthetic projective transformation image 122a corresponding to the mask region 51.

In the next step S124, the image superimposition unit 124 of the image processing unit 12 generates the synthetic display image 124a by superimposing the complementary image 123a on the mask region 51 in the first image 31.

The image output unit 13 outputs the synthetic display image 124a to the display device 100. As shown in FIG. 2, the display device 100 displays a display image 130, in which the inside of the mask region 51 has been replaced with a dead region image 130a based on the complementary image 123a, on the screen.

Figure 4:
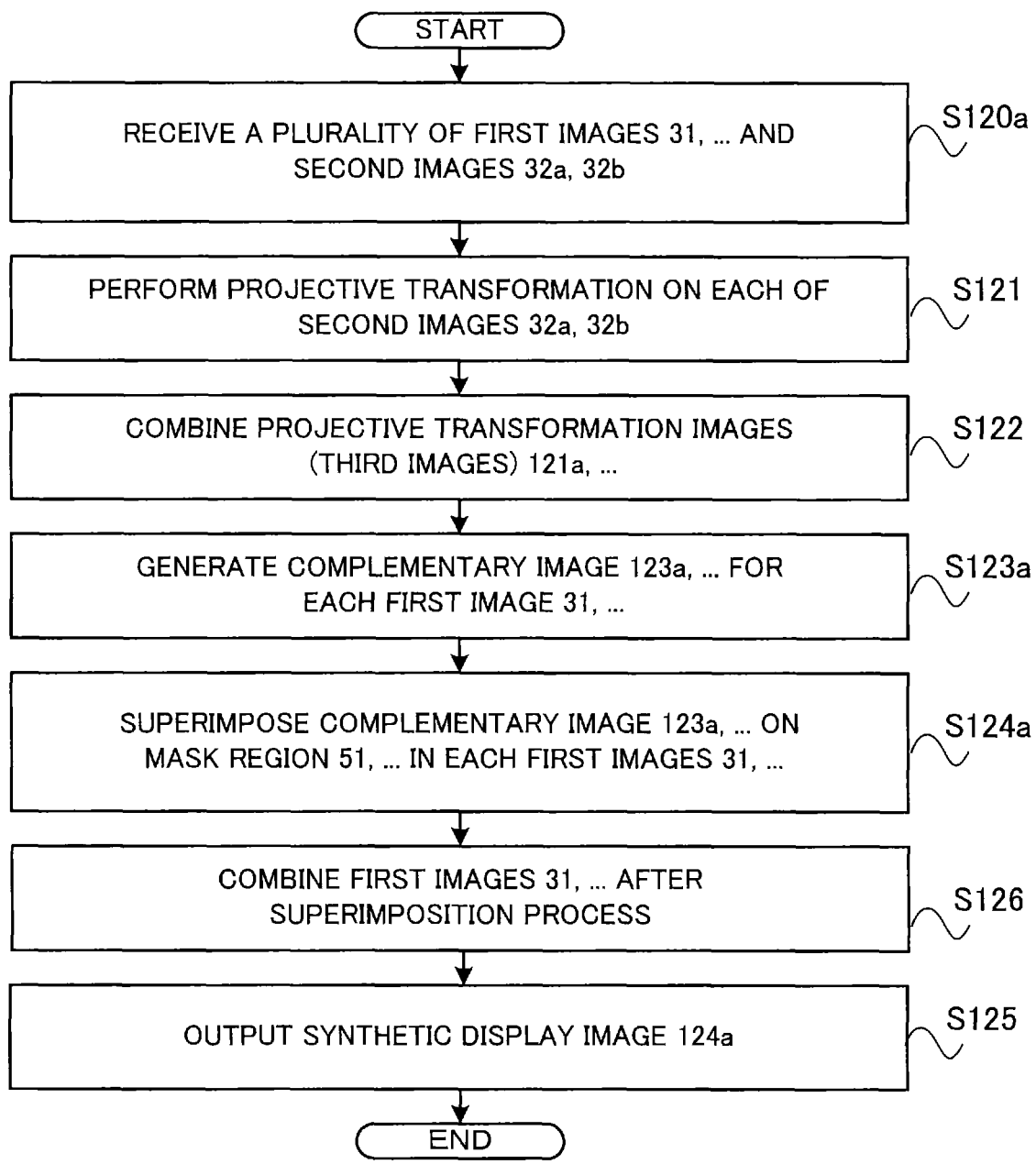
FIG. 4 is a flowchart showing another operation example of the image processing device according to the first embodiment.

FIG. 4 is a flowchart showing another operation example of the image processing device 1 according to the first embodiment. In FIG. 4, each process step identical or corresponding to a process step shown in FIG. 3 is assigned the same reference character as in FIG. 3. The operation example of FIG. 4 differs from the operation example of FIG. 3 in that the reception unit 11 receives a plurality of first images 31, . . . in step S120a.

In the operation example of FIG. 4, the complementary image generation unit 123 in step S123a generates a plurality of complementary images 123a, . . . corresponding to the mask regions 51, . . . in the plurality of first images 31, . . . .

Further, in the operation example of FIG. 4, the image superimposition unit 124 in step S124a superimposes the corresponding complementary images 123a, . . . on the mask regions 51, . . . in the plurality of first images 31, . . . . In step S126, the image superimposition unit 124 generates the synthetic display image 124a by connecting and combining the plurality of first images 31, . . . after the superimposition process.

Figure 5:
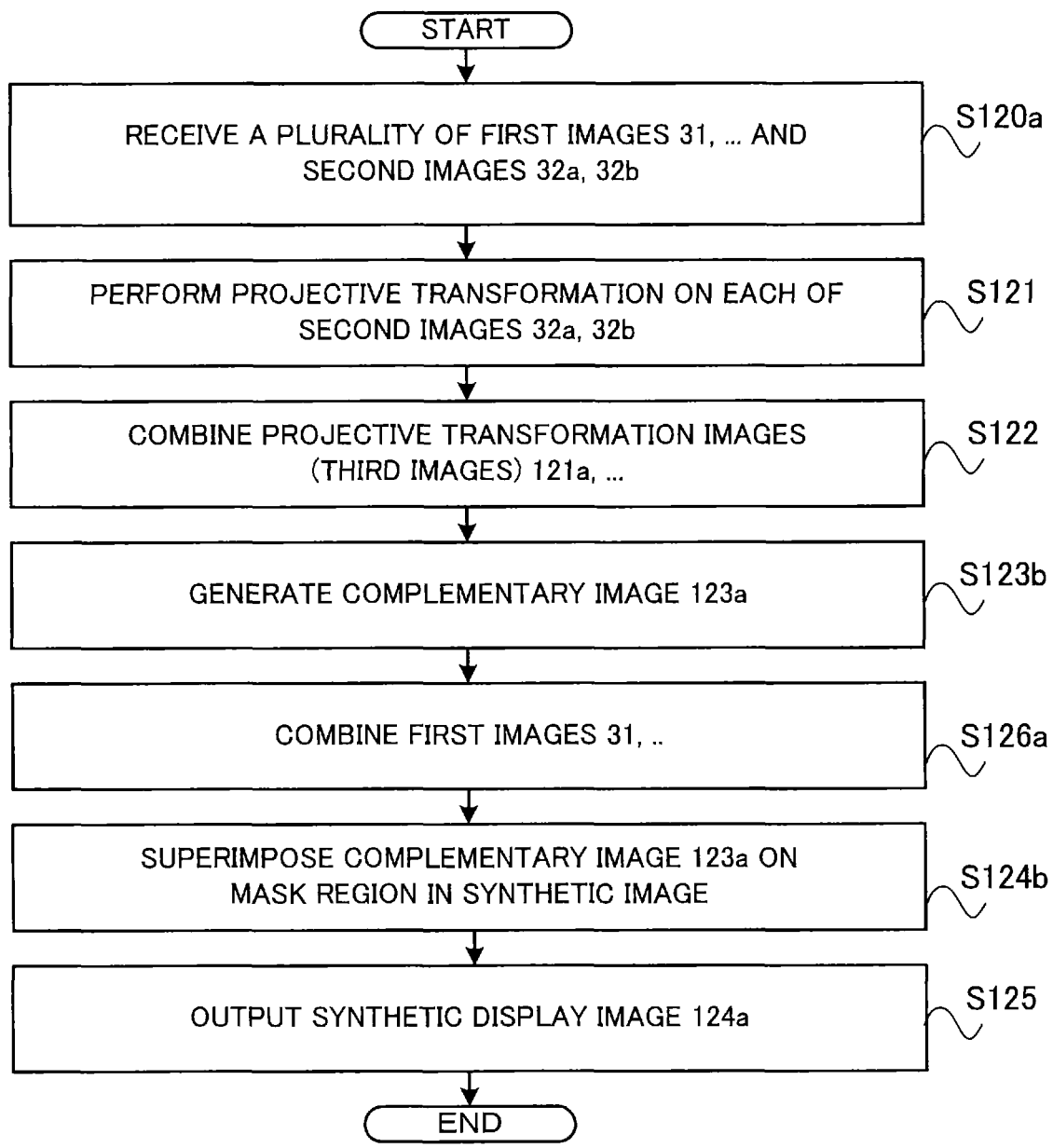
FIG. 5 is a flowchart showing another operation example of the image processing device according to the first embodiment.

FIG. 5 is a flowchart showing another operation example of the image processing device 1 according to the first embodiment. In FIG. 5, each process step identical or corresponding to a process step shown in FIG. 3 or FIG. 4 is assigned the same reference character as in FIG. 3 or FIG. 4. The operation example of FIG. 5 differs from the operation example of FIG. 3 in that the reception unit 11 receives a plurality of first images 31, . . . in step S120a.

In the operation example of FIG. 5, the complementary image generation unit 123 in step S123b generates a complementary image 123a corresponding to the mask region in a synthetic image of the plurality of first images 31, . . . . In step S126a, the image superimposition unit 124 generates the synthetic image by connecting and combining the plurality of first images 31, . . . .

In the next step S124b, the image superimposition unit 124 generates the synthetic display image 124a by superimposing the complementary image 123a on the mask region in the synthetic image.

(1-3) Effect

As described above, with the image processing device 1 and the monitoring system according to the first embodiment, even when the dead region 60 hidden by the object 50 and invisible arises in the first image 31 as a wide range image, the display image 130 including the dead region image 130a in which the dead region 60 has been replaced with the complementary image 123a can be displayed on one screen of the display device 100. Accordingly, an observer can grasp the condition of the image capture region easily and correctly compared to cases where only the dead region image 130a is displayed on a different screen.

(2) Second Embodiment

Figure 6:
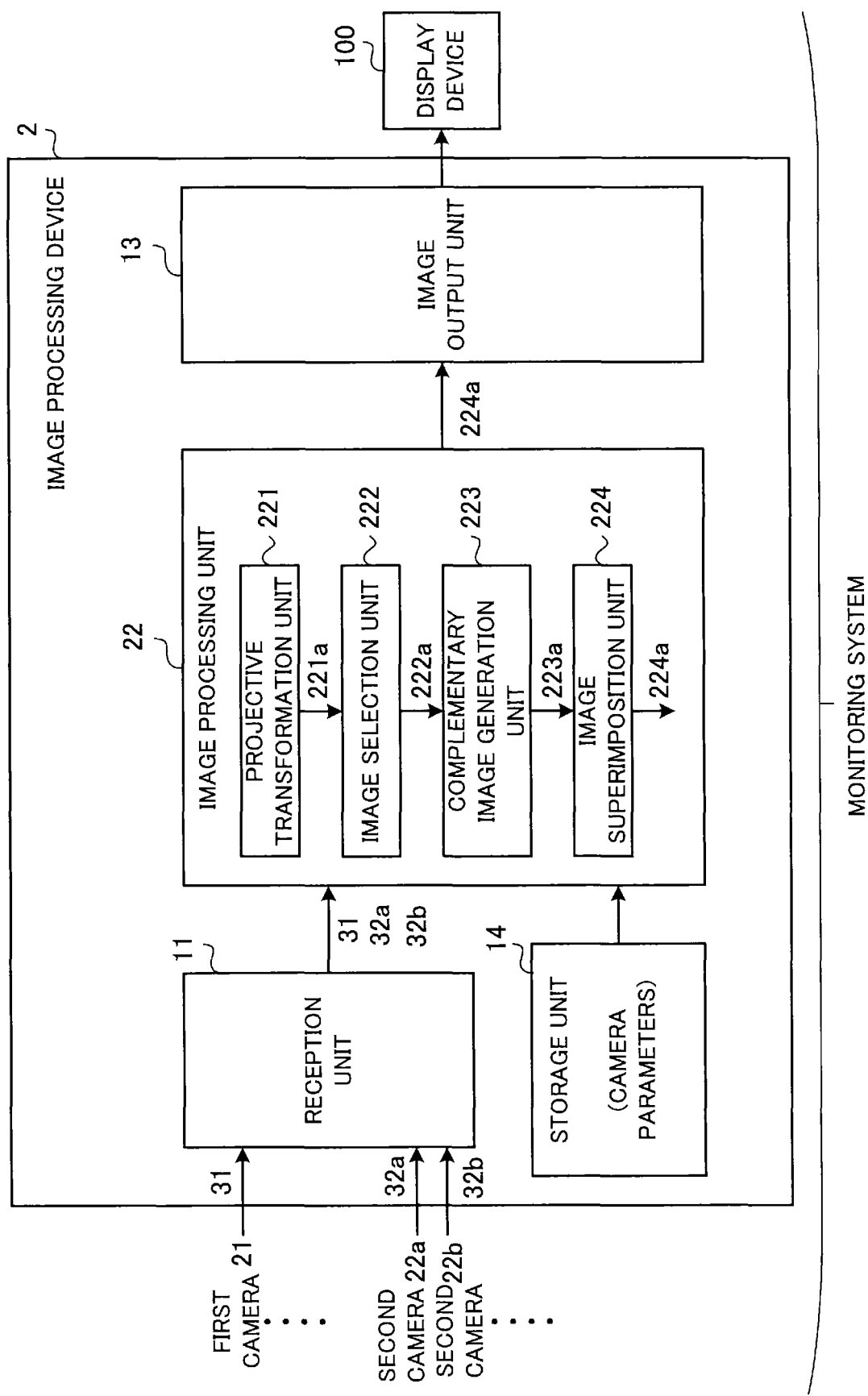
FIG. 6 is a functional block diagram schematically showing an image processing device and a monitoring system according to a second embodiment of the present invention.

FIG. 6 is a functional block diagram schematically showing an image processing device 2 and a monitoring system according to a second embodiment. In FIG. 6, each component identical or corresponding to a component shown in FIG. 1 is assigned the same reference character as in FIG. 1. As shown in FIG. 6, the image processing device 2 includes the reception unit 11, an image processing unit 22, the image output unit 13 and the storage unit 14. The image processing unit 22 includes a projective transformation unit 221, an image selection unit 222, a complementary image generation unit 223 and an image superimposition unit 224.

In the first embodiment, the complementary image 123a is generated by using the synthetic projective transformation image 122a of the second images 32a and 32b. In the second embodiment, one of the second images 32a and 32b is selected and a complementary image 223a is generated by using a selection image 222a as the selected second image. Except for this feature, the second embodiment is the same as the first embodiment.

Figure 7:
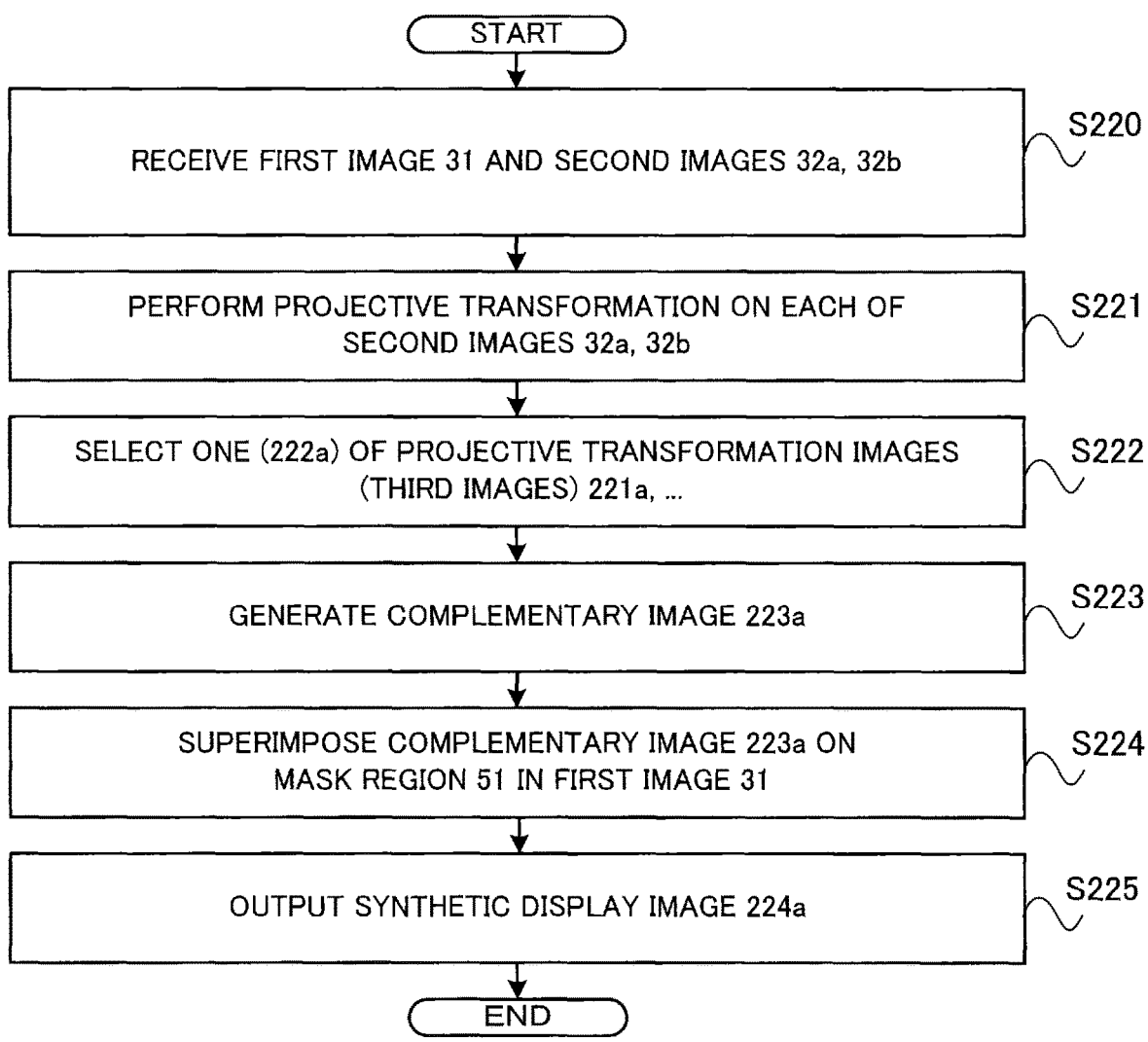
FIG. 7 is a flowchart showing an operation example of the image processing device according to the second embodiment.

FIG. 7 is a flowchart showing an operation example of the image processing device 2 according to the second embodiment. First, in step S220, the reception unit 11 of the image processing device 2 receives the first image 31 and the second images 32a and 32b.

In the next step S221, the projective transformation unit 221 of the image processing unit 22 generates two projective transformation images (third images) 221a, . . . as viewed from a predetermined position by performing the projective transformation on each of the second images 32a and 32b.

In the next step S222, the image selection unit 222 of the image processing unit 22 selects a projective transformation image (fourth image) 222a, capable of providing a partial region that minimizes energy of pixels at the boundary of the mask region 51 when the partial region of each of a plurality of projective transformation images 221a, . . . is arranged in the mask region 51, from the plurality of projective transformation images 221a, . . . . The method using the energy of the pixels at the boundary of the mask region 51 is the seam carving method, for example.

In the next step S223, the complementary image generation unit 223 of the image processing unit 22 generates the complementary image 223a by extracting an image of a region in the selection image 222a as the selected projective transformation image corresponding to the mask region 51.

In the next step S224, the image superimposition unit 224 of the image processing unit 22 generates a synthetic display image 224a by superimposing the complementary image 223a on the mask region 51 in the first image 31.

The image output unit 13 outputs the synthetic display image 224a generated by the image processing unit 22 to the display device 100 without change or after converting the signal format. The display device 100 displays the display image including the image of the dead region on the screen.

As described above, with the image processing device 2 and the monitoring system according to the second embodiment, the condition of the image capture region can be grasped easily and correctly compared to cases where the dead region image is displayed on a different screen.

Further, since the second images 32a and 32b are not combined together in the second embodiment, the data processing load can be reduced compared to the first embodiment.

(3) Third Embodiment

Figure 8:
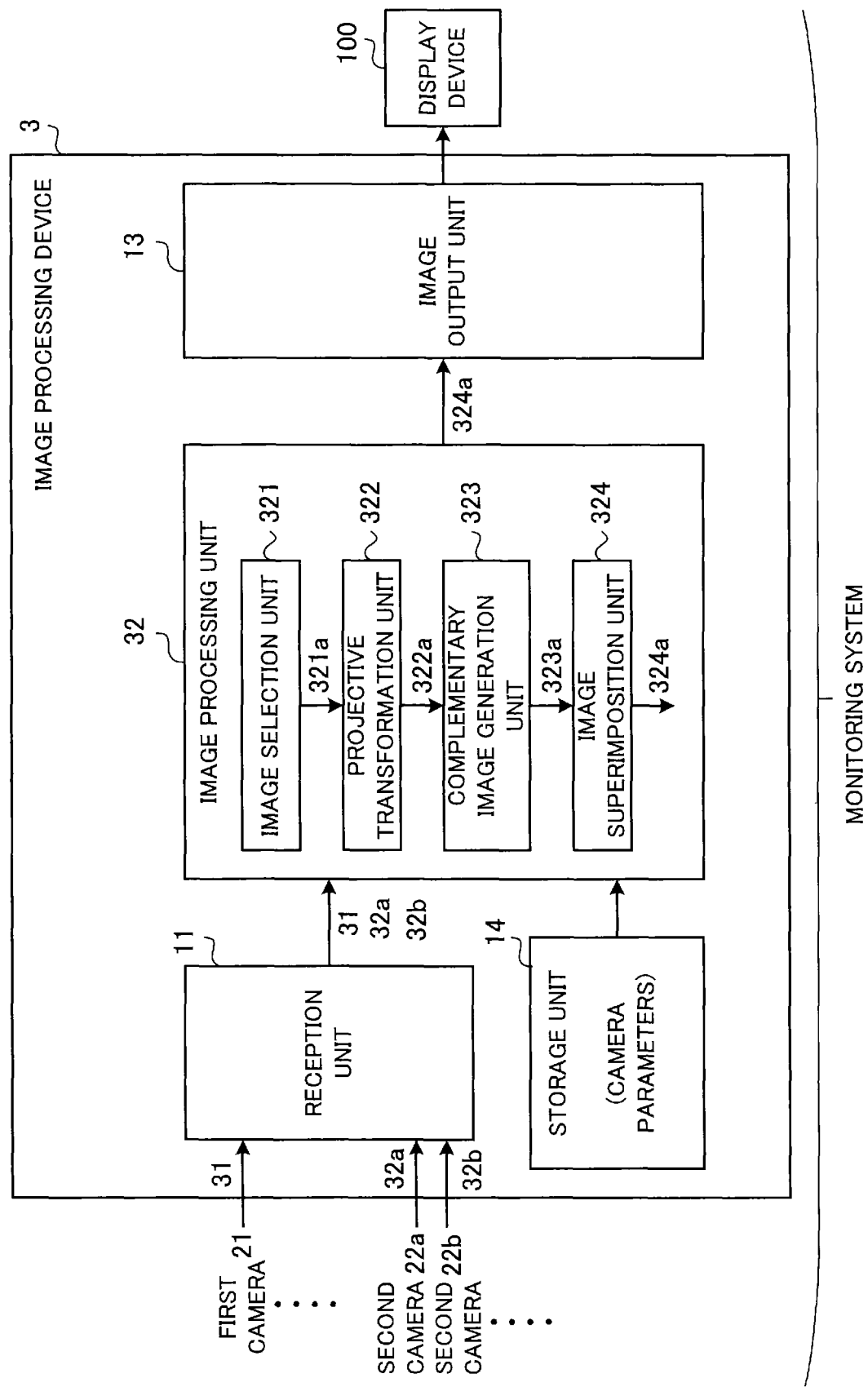
FIG. 8 is a functional block diagram schematically showing an image processing device and a monitoring system according to a third embodiment of the present invention.

FIG. 8 is a functional block diagram schematically showing an image processing device 3 and a monitoring system according to a third embodiment. In FIG. 8, each component identical or corresponding to a component shown in FIG. 1 or FIG. 6 is assigned the same reference character as in FIG. 1 or FIG. 6. As shown in FIG. 8, the image processing device 3 includes the reception unit 11, an image processing unit 32, the image output unit 13 and the storage unit 14. The image processing unit 32 includes an image selection unit 321, a projective transformation unit 322, a complementary image generation unit 323 and an image superimposition unit 324.

In the first embodiment, the complementary image 123a is generated by using the synthetic projective transformation image 122a of the second images 32a and 32b. In the third embodiment, one of the second images 32a and 32b is selected and a complementary image 323a is generated by using a selection image 321a obtained by performing the projective transformation on the selected second image. Except for this feature, the third embodiment is the same as the first embodiment.

Figure 9:
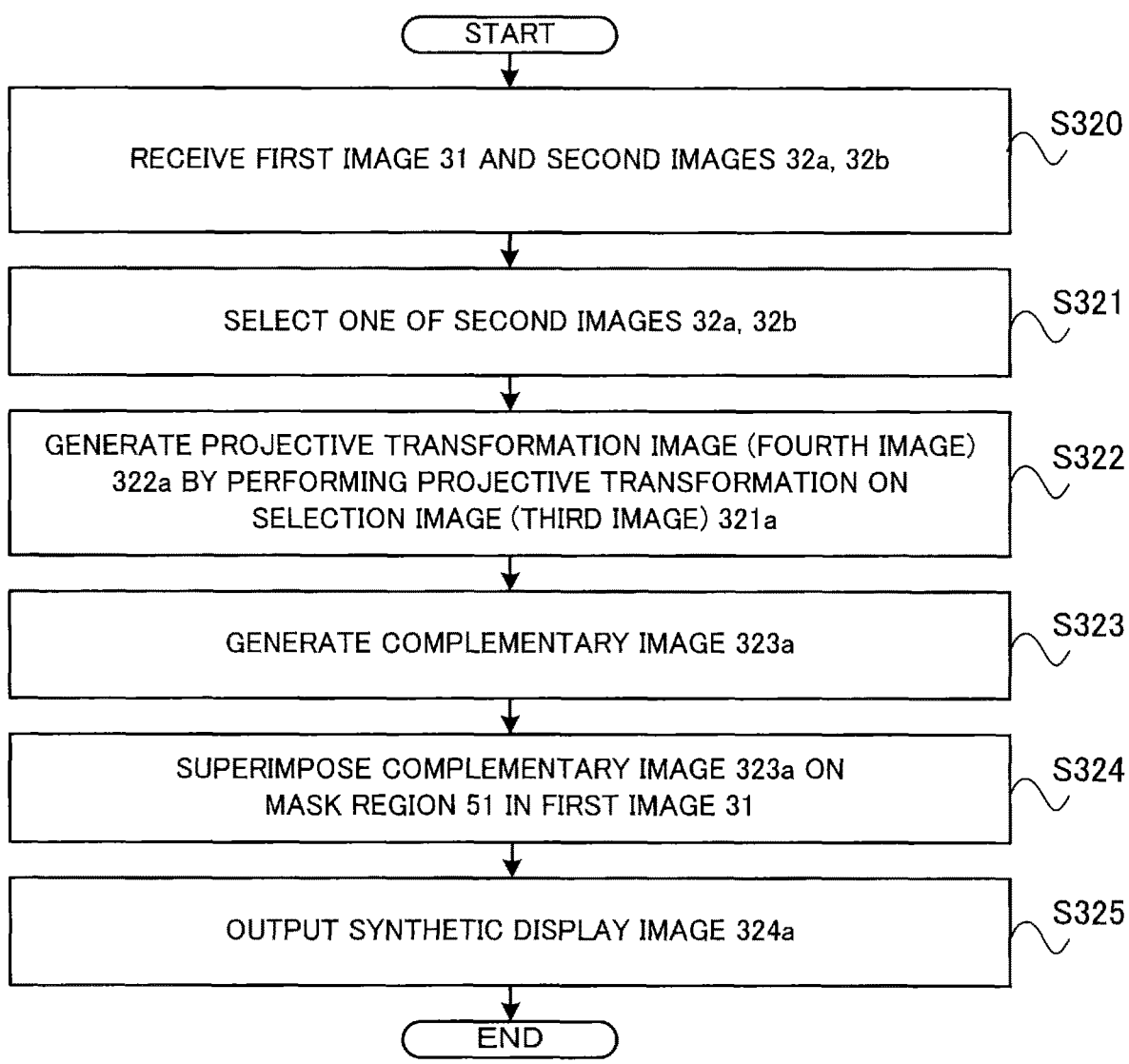
FIG. 9 is a flowchart showing an operation example of the image processing device according to the third embodiment.

FIG. 9 is a flowchart showing an operation example of the image processing device 3 according to the third embodiment. First, in step S320, the reception unit 11 of the image processing device 3 receives the first image 31 and the second images 32a and 32b.

In the next step S321, the image selection unit 321 of the image processing unit 32 selects the selection image (third image) 321a, as the second image captured by the second camera 22a or 22b having an optical axis 42a or 42b in a direction closer to the direction of the optical axis 41 of the first camera 21, from the second images 32a and 32b.

In the next step S322, the projective transformation unit 322 of the image processing unit 32 generates a projective transformation image (fourth image) 322a as viewed from a predetermined position by performing the projective transformation on the selection image 321a.

In the next step S323, the complementary image generation unit 323 of the image processing unit 32 generates the complementary image 323a by extracting an image of a region in the projective transformation image 322a corresponding to the mask region 51.

In the next step S324, the image superimposition unit 324 of the image processing unit 32 generates a synthetic display image 324a by superimposing the complementary image 323a on the mask region 51 in the first image 31.

The image output unit 13 outputs the synthetic display image 324a generated by the image processing unit 32 to the display device 100 without change or after converting the signal format. The display device 100 displays the display image including the image of the dead region on the screen.

As described above, with the image processing device 3 and the monitoring system according to the third embodiment, the synthetic display image in which the dead region 60 has been replaced with the complementary image can be displayed on one screen of the display device 100. Accordingly, the condition of the image capture region can be grasped easily and correctly compared to cases where the image of the dead region is displayed on a different screen.

Further, the data processing load can be reduced since the second images 32a and 32b are not combined together in the third embodiment.

(4) Fourth Embodiment

Figure 10:
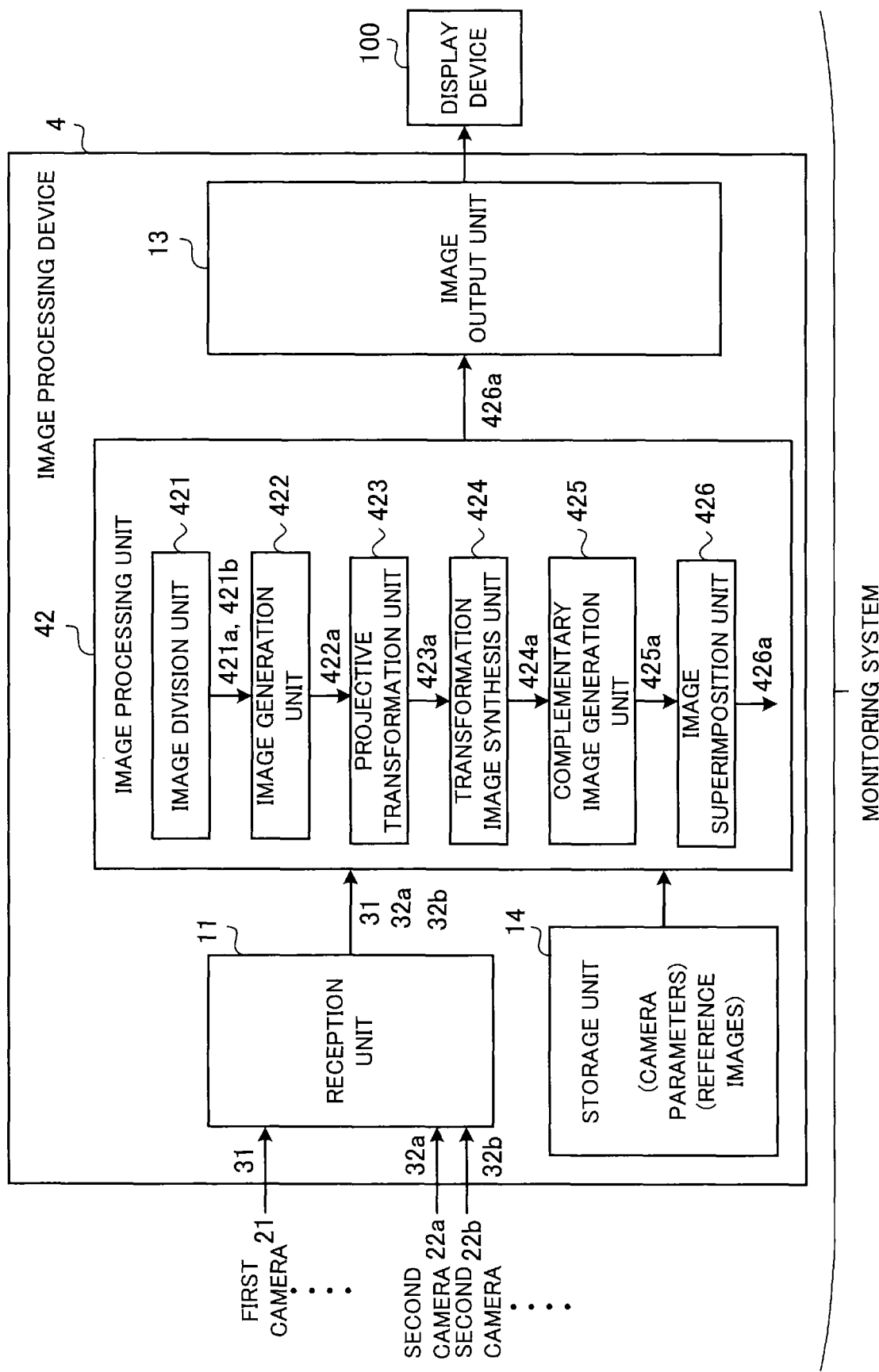
FIG. 10 is a functional block diagram schematically showing an image processing device and a monitoring system according to a fourth embodiment of the present invention.

FIG. 10 is a functional block diagram schematically showing an image processing device 4 according to a fourth embodiment. In FIG. 10, each component identical or corresponding to a component shown in FIG. 1 is assigned the same reference character as in FIG. 1. As shown in FIG. 10, the monitoring system includes at least one first camera 21, a plurality of second cameras 22a and 22b, the image processing device 4 and the display device 100. The image processing device 4 includes the reception unit 11, an image processing unit 42, the image output unit 13, and the storage unit 14 that stores the camera parameter information and reference image information. Reference images represented by the reference image information are images based on second images captured in the past by the second cameras 22a and 22b. In cases where the object 50 (shown in FIG. 11 which will be explained later) moves, information at a time when the object 50 does not exist is included in the reference images. The image processing unit 42 includes an image division unit 421, an image generation unit 422, a projective transformation unit 423, a transformation image synthesis unit 424, a complementary image generation unit 425 and an image superimposition unit 426.

The fourth embodiment differs from the first embodiment in executing a process of dividing each of the second images 32a and 32b into a foreground image part 421a indicating the object 50 and a background image part 421b other than the foreground image part 421a and replacing the foreground image part with a part of a previously stored reference image.

Figure 11:
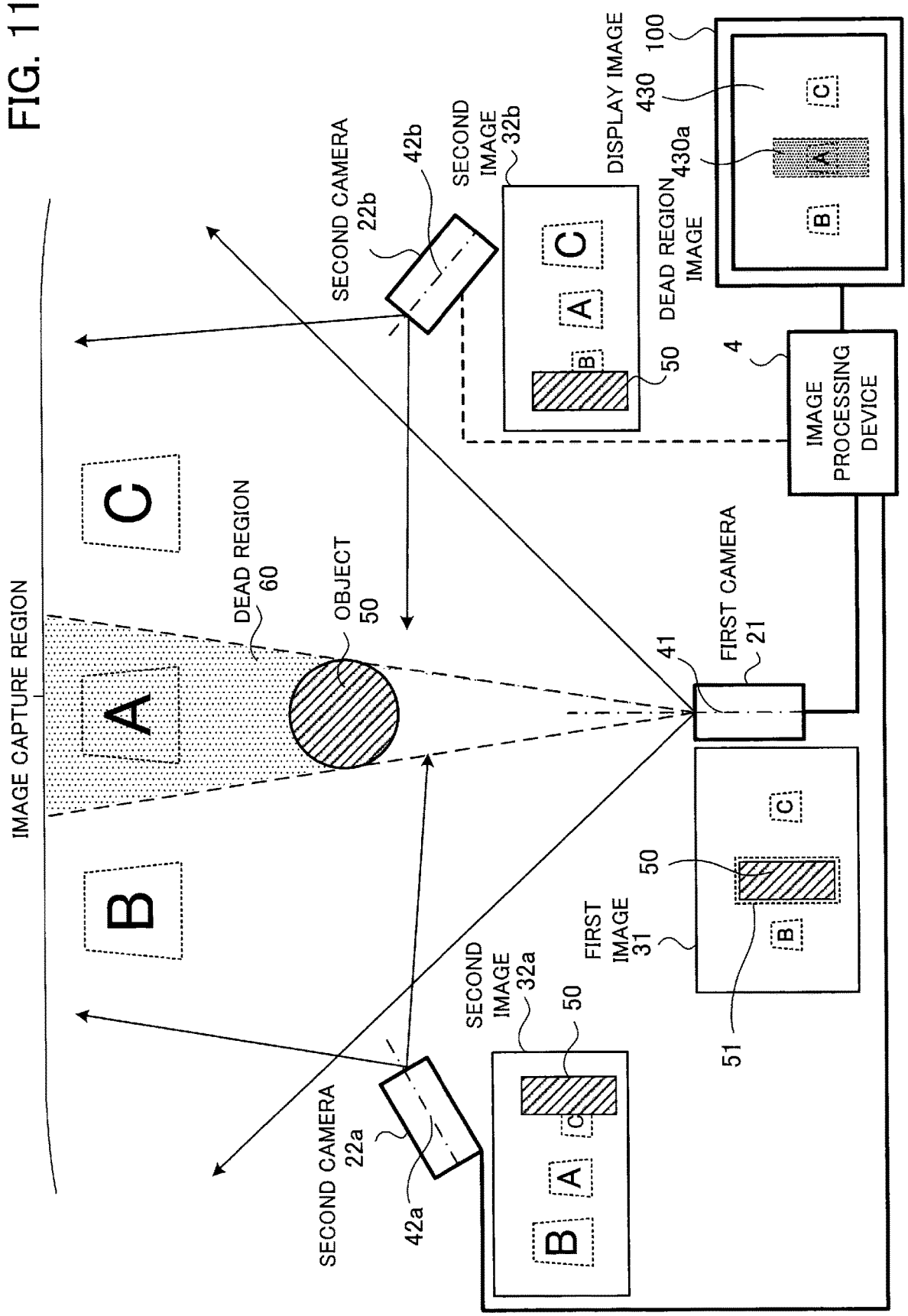
FIG. 11 is an explanatory drawing showing the operation of the image processing device and the monitoring system according to the fourth embodiment.

FIG. 11 is an explanatory drawing showing the operation of the image processing device 4 and the monitoring system according to the fourth embodiment. In FIG. 11, each component identical or corresponding to a component shown in FIG. 2 is assigned the same reference character as in FIG. 2. In the example of FIG. 11, the display device 100 displays a display image 430 including a dead region image 430a generated based on a reference image.

Figure 12:
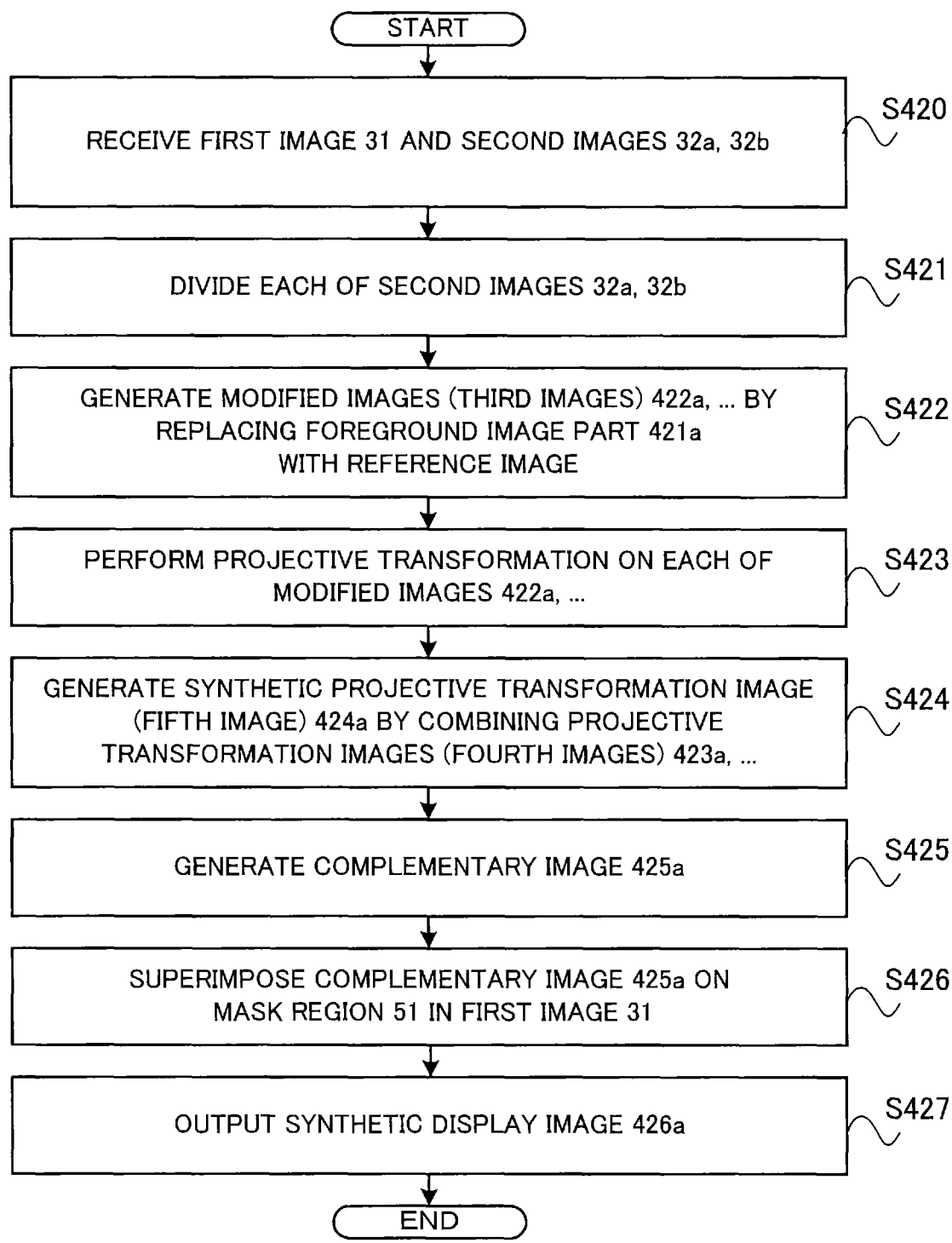
FIG. 12 is a flowchart showing an operation example of the image processing device according to the fourth embodiment.

FIG. 12 is a flowchart showing an operation example of the image processing device 4 according to the fourth embodiment. First, in step S420, the reception unit 11 of the image processing device 4 receives the first image 31 and the second images 32a and 32b.

In the next step S421, the image division unit 421 of the image processing unit 42 divides each of the second images 32a and 32b into the foreground image part 421a occupied by the object 50 and the background image part 421b other than the foreground image part 421a. Extraction of the object 50 as the foreground image part is carried out by using an image segmentation technology for image region extraction called graph cut, for example. By using graph cut, each of the second images can be divided into the background image part 421b and the foreground image part 421a. Incidentally, it is also possible to use a different method such as semantic segmentation by use of deep learning for the extraction of the foreground image part 421a.

In the next step S422, the image generation unit 422 of the image processing unit 42 generates a plurality of modified images (third images) 422a, . . . from the second images 32a and 32b by replacing the foreground image part 421a with an image part as a part of a reference image.

In the next step S423, the projective transformation unit 423 of the image processing unit 42 generates a plurality of projective transformation images (fourth images) 423a, . . . as viewed from a predetermined position by performing the projective transformation on each of the plurality of modified images 422a, . . . . The predetermined position is, for example, the position of the first camera 21, or desired to be a position on the optical axis of the first camera 21.

In the next step S424, the transformation image synthesis unit 424 of the image processing unit 42 generates a synthetic projective transformation image (fifth image) 424a by combining the plurality of projective transformation images 423a, . . . .

In the next step S425, the complementary image generation unit 425 of the image processing unit 42 generates a complementary image 425a by extracting an image of a region in the synthetic projective transformation image 424a corresponding to the mask region.

In the next step S426, the image superimposition unit 426 of the image processing unit 42 generates a synthetic display image 426a by superimposing the complementary image 425a on the mask region 51 in the first image 31. The superimposition can be the blend process taking into account the transparency of each image.

The image output unit 13 outputs the synthetic display image 426a generated by the image processing unit 42 to the display device 100 without change or after converting the signal format. The display device 100 displays the display image (430 in FIG. 11), in which the inside of the mask region 51 has been replaced with the dead region image (430a in FIG. 11) based on the complementary image 425a, on the screen.

Figure 13:
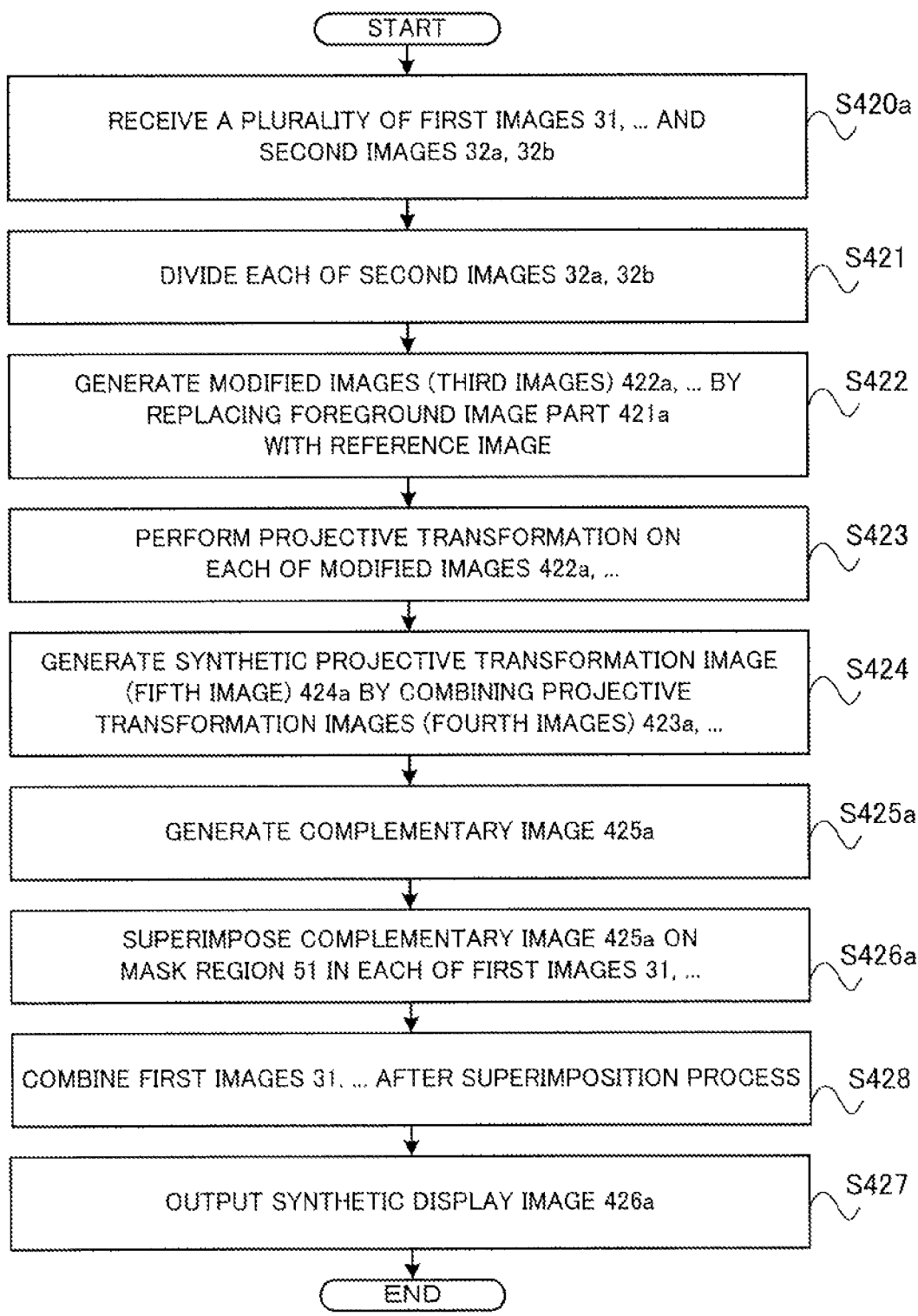
FIG. 13 is a flowchart showing another operation example of the image processing device according to the fourth embodiment.

FIG. 13 is a flowchart showing another operation example of the image processing device 4 according to the fourth embodiment. In FIG. 13, each process step identical or corresponding to a process step shown in FIG. 12 is assigned the same reference character as in FIG. 12. The operation example of FIG. 13 differs from the operation example of FIG. 12 in that the reception unit 11 receives a plurality of first images 31, . . . in step S420a.

In the operation example of FIG. 13, the complementary image generation unit 425 in step S425a generates a complementary image 425a in regard to the mask region 51 in each of the plurality of first images 31, . . . . In step S426a, the image superimposition unit 426 superimposes the complementary images 425a, . . . on the mask regions 51 in the plurality of first images 31.

In the operation example of FIG. 13, the image superimposition unit 426 in step S428 generates the synthetic display image 426a by connecting and combining the plurality of first images 31, . . . after the superimposition process.

Figure 14:
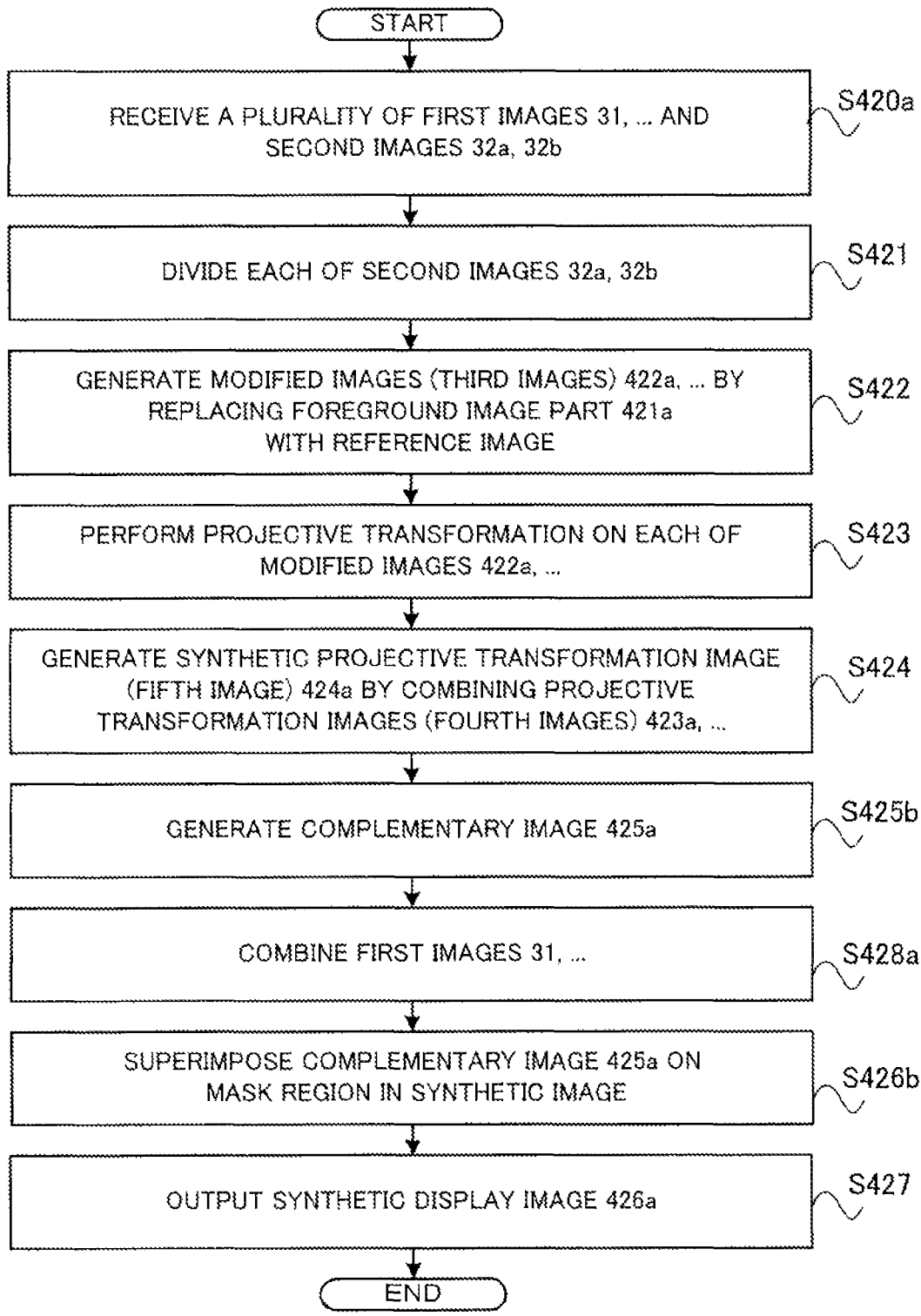
FIG. 14 is a flowchart showing another operation example of the image processing device according to the fourth embodiment.

FIG. 14 is a flowchart showing another operation example of the image processing device 4 according to the fourth embodiment. In FIG. 14, each process step identical or corresponding to a process step shown in FIG. 12 or FIG. 13 is assigned the same reference character as in FIG. 12 or FIG. 13. The operation example of FIG. 14 differs from the operation example of FIG. 12 in that the reception unit 11 receives a plurality of first images 31, . . . in step S420a.

In the operation example of FIG. 14, the complementary image generation unit 425 in step S425b generates a complementary image 425a in regard to the mask region 51 in a synthetic image of the plurality of first images 31, . . . . In step S428a, the image superimposition unit 426 generates the synthetic image by connecting and combining the plurality of first images 31, . . . .

In the operation example of FIG. 14, the image superimposition unit 426 in the next step S426b generates the synthetic display image 426a by superimposing the complementary image 425a on the mask region in the synthetic image.

As described above, with the image processing device 4 and the monitoring system according to the fourth embodiment, the display image 430 including the dead region image 430a is displayed on one screen of the display device 100. Accordingly, the condition of the image capture region can be grasped easily and correctly compared to cases where the dead region image 430a is displayed on a different screen.

Further, in the fourth embodiment, the second images are modified by using the previously stored reference images, and thus quality of the synthetic display image can be improved without increasing the data processing load.

(5) Fifth Embodiment

Figure 15:
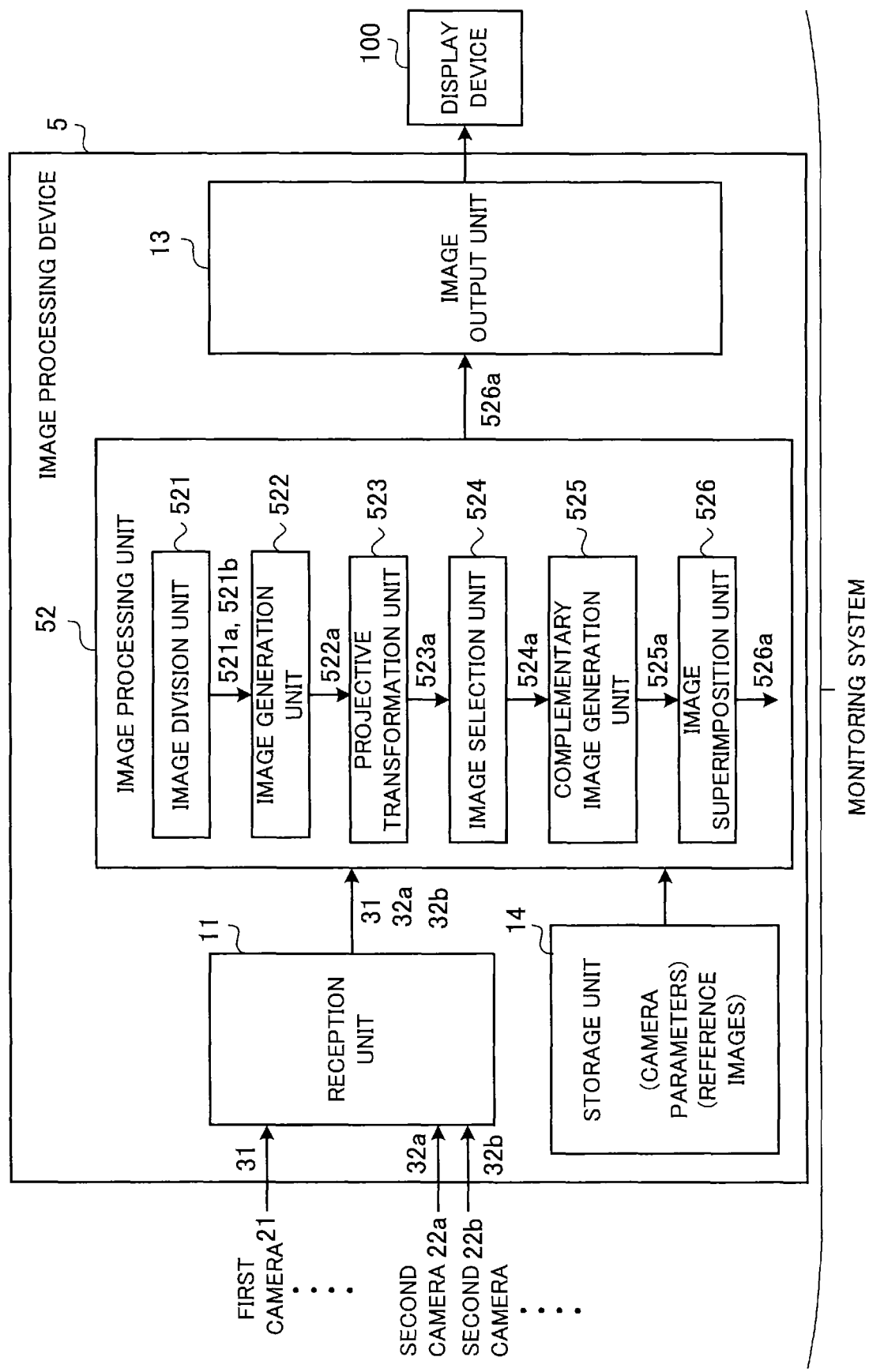
FIG. 15 is a functional block diagram schematically showing an image processing device and a monitoring system according to a fifth embodiment of the present invention.

FIG. 15 is a functional block diagram schematically showing an image processing device 5 and a monitoring system according to a fifth embodiment. In FIG. 15, each component identical or corresponding to a component shown in FIG. 10 is assigned the same reference character as in FIG. 10. As shown in FIG. 15, the image processing device 5 includes the reception unit 11, an image processing unit 52, the image output unit 13 and the storage unit 14. The image processing unit 52 includes an image division unit 521, an image generation unit 522, a projective transformation unit 523, an image selection unit 524, a complementary image generation unit 525 and an image superimposition unit 526.

In the fourth embodiment, the complementary image 425a is generated by using the synthetic projective transformation image 424a of the second images 32a and 32b. In the fifth embodiment, one of the second images 32a and 32b is selected and a complementary image 525a is generated by using a selection image 524a as the selected second image. Except for this feature, the fifth embodiment is the same as the fourth embodiment.

Figure 16:
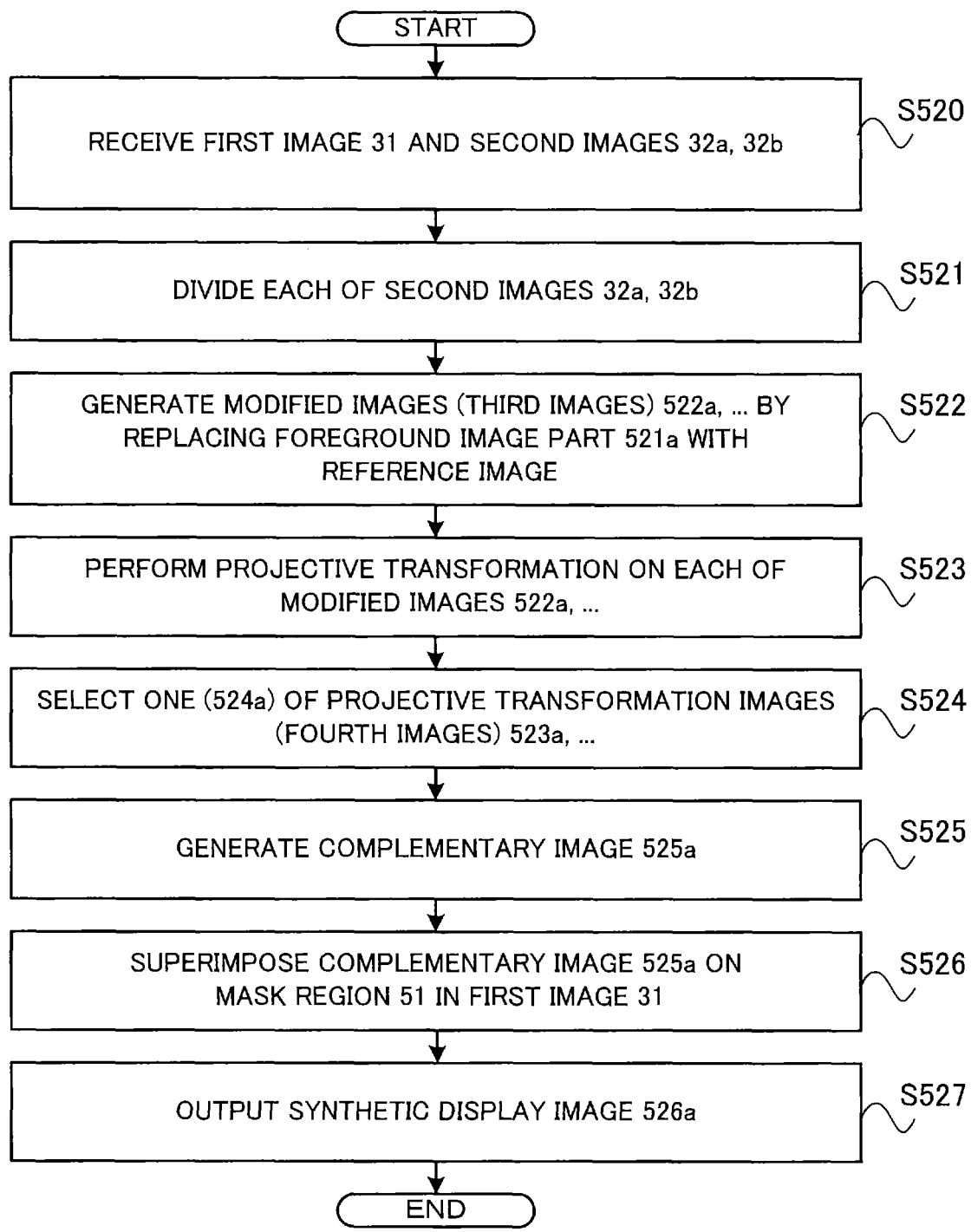
FIG. 16 is a flowchart showing an operation example of the image processing device according to the fifth embodiment.

FIG. 16 is a flowchart showing an operation example of the image processing device 5 according to the fifth embodiment. First, in step S520, the reception unit 11 of the image processing device 5 receives the first image 31 and the second images 32a and 32b.

In the next step S521, the image division unit 521 of the image processing unit 52 divides each of the second images 32a and 32b into a foreground image part 521a occupied by the object 50 and a background image part 521b other than the foreground image part 521a.

In the next step S522, the image generation unit 522 of the image processing unit 52 generates a plurality of modified images (third images) 522a, . . . by replacing the foreground image part 521a with an image as a part of a reference image.

In the next step S523, the projective transformation unit 523 of the image processing unit 52 generates a plurality of projective transformation images (fourth images) 523a, . . . as viewed from a predetermined position by performing the projective transformation on each of the plurality of modified images 522a, . . . .

In the next step S524, the image selection unit 524 of the image processing unit 52 selects a selection image (fifth image) 524a, capable of providing a partial region that minimizes the energy of pixels at the boundary of the mask region when the partial region of each of the plurality of projective transformation images 523a, . . . is arranged in the mask region, from the plurality of projective transformation images 523a, . . . .

In the next step S525, the complementary image generation unit 525 of the image processing unit 52 generates the complementary image 525a by extracting an image of a region in the selection image 524a corresponding to the mask region 51.

In the next step S526, the image superimposition unit 526 of the image processing unit 52 generates a synthetic display image 526a by superimposing the complementary image 525a on the mask region 51 in the first image 31.

The image output unit 13 outputs the synthetic display image 526a generated by the image processing unit 52 to the display device 100 without change or after converting the signal format. The display device 100 displays the display image including the image of the dead region on the screen.

As described above, with the image processing device 5 and the monitoring system according to the fifth embodiment, the synthetic display image in which the dead region 60 has been replaced with the complementary image can be displayed on one screen of the display device 100. Accordingly, the condition of the image capture region can be grasped easily and correctly compared to cases where the image of the dead region is displayed on a different screen.

Further, in the fifth embodiment, the second images are modified by using the previously stored reference images, and thus the quality of the synthetic display image can be improved without increasing the data processing load.

(6) Sixth Embodiment

Figure 17:
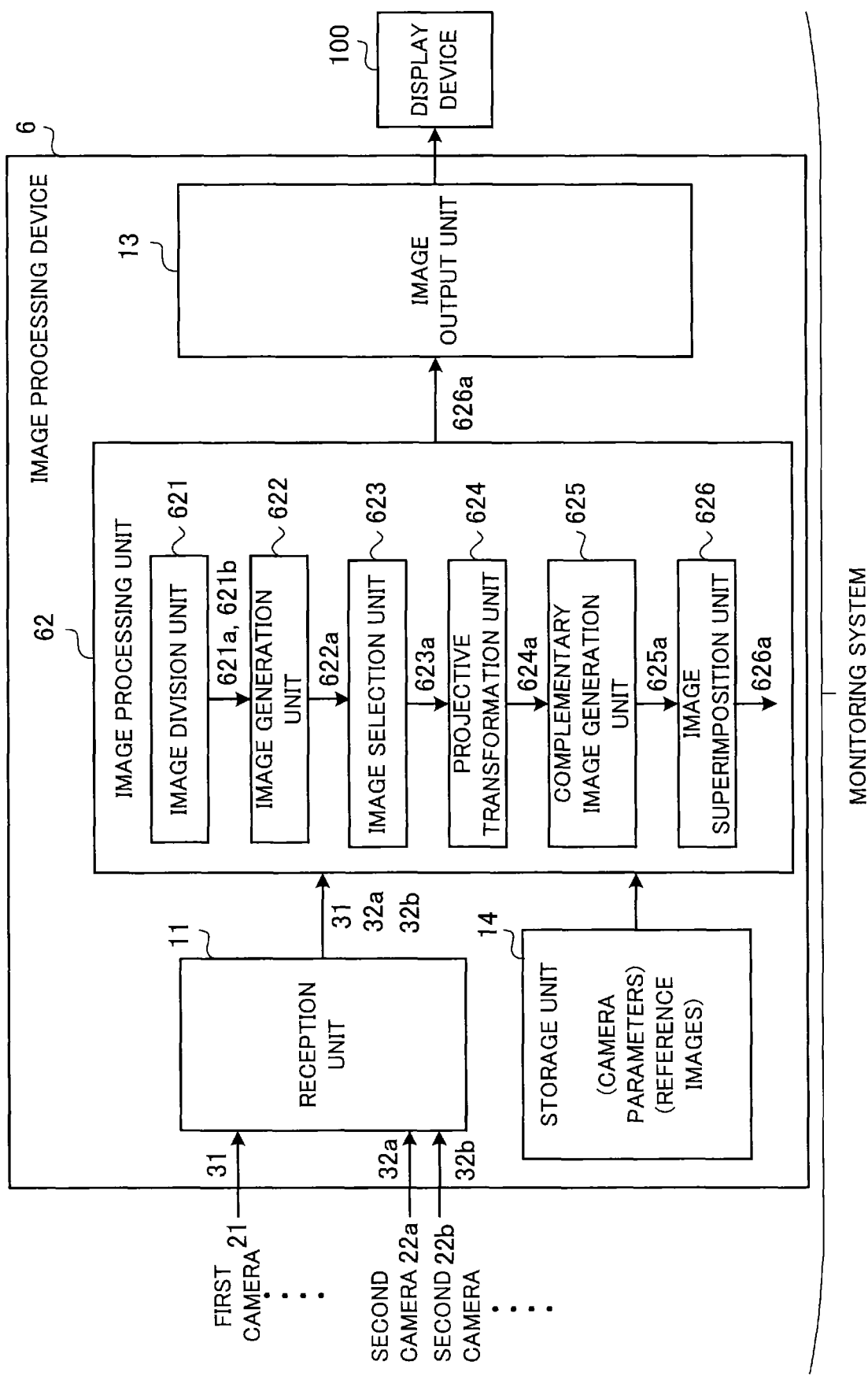
FIG. 17 is a functional block diagram schematically showing an image processing device and a monitoring system according to a sixth embodiment of the present invention.

FIG. 17 is a functional block diagram schematically showing an image processing device 6 and a monitoring system according to a sixth embodiment. In FIG. 17, each component identical or corresponding to a component shown in FIG. 10 or FIG. 15 is assigned the same reference character as in FIG. 10 or FIG. 15. As shown in FIG. 17, the image processing device 6 includes the reception unit 11, an image processing unit 62, the image output unit 13 and the storage unit 14. The image processing unit 62 includes an image division unit 621, an image generation unit 622, an image selection unit 623, a projective transformation unit 624, a complementary image generation unit 625 and an image superimposition unit 626.

In the fourth embodiment, the complementary image 425a is generated by using the synthetic projective transformation image 424a of the second images 32a and 32b. In the sixth embodiment, one of the second images 32a and 32b is selected and a complementary image 625a is generated by using a selected selection image 623a. Except for this feature, the sixth embodiment is the same as the fourth embodiment.

Figure 18:
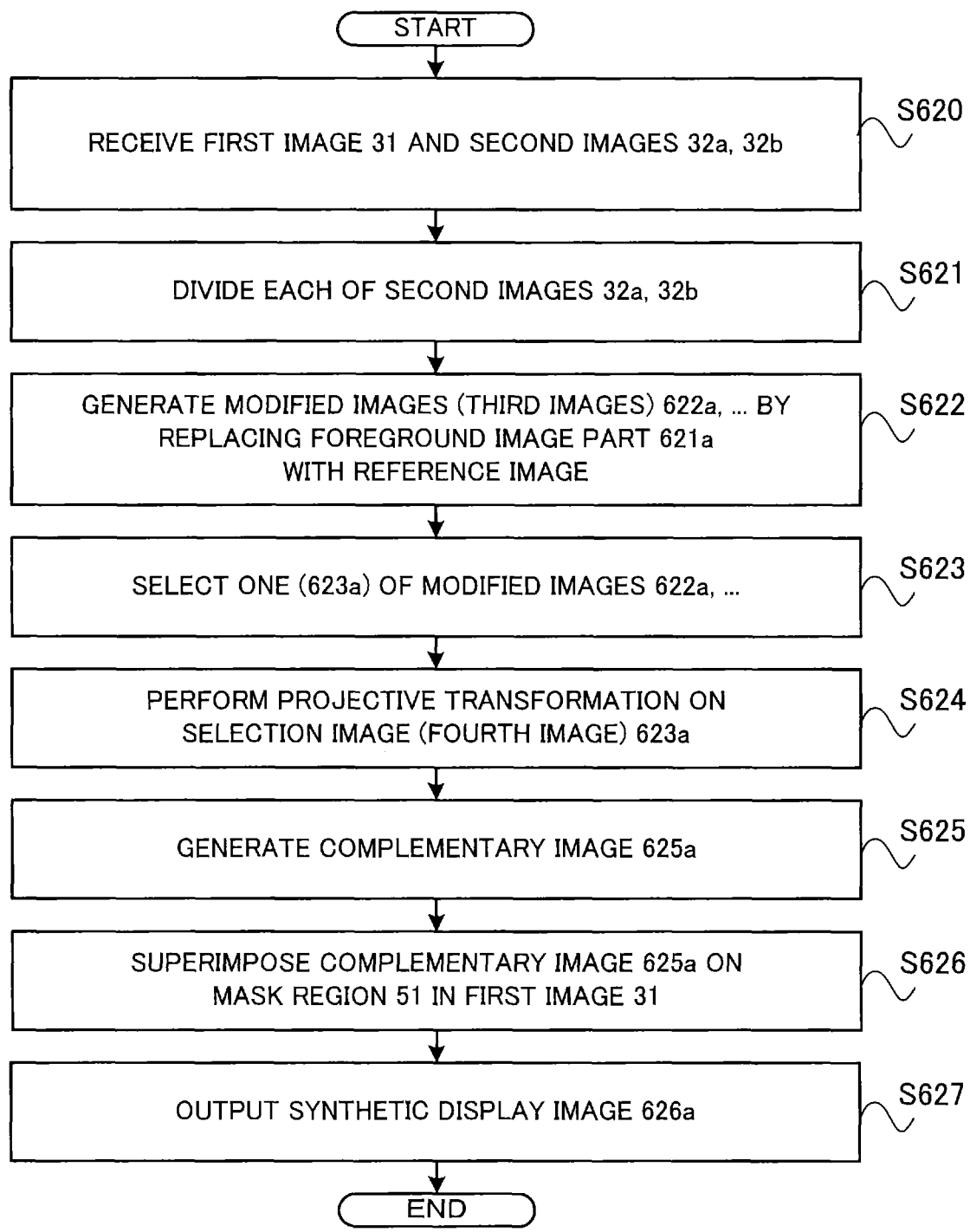
FIG. 18 is a flowchart showing an operation example of the image processing device according to the sixth embodiment.

FIG. 18 is a flowchart showing an operation example of the image processing device 6 according to the sixth embodiment. First, in step S620, the reception unit 11 of the image processing device 6 receives the first image 31 and the second images 32a and 32b.

In the next step S621, the image division unit 621 of the image processing unit 62 divides each of the second images 32a and 32b into a foreground image part 621a occupied by the object 50 and a background image part 621b other than the foreground image part 621a.

In the next step S622, the image generation unit 622 of the image processing unit 62 generates a plurality of modified images (third images) 622a, . . . from the second images 32a and 32b by replacing the foreground image part 621a with an image as a part of a reference image.

In the next step S623, the image selection unit 623 of the image processing unit 62 selects the selection image 623a (fourth image), captured by the second camera 22a or 22b having the optical axis 42a or 42b in a direction closer to the direction of the optical axis 41 of the first camera 21, from the plurality of modified images 622a, . . . .

In the next step S624, the projective transformation unit 624 of the image processing unit 62 generates a projective transformation image (fifth image) 624a as viewed from a predetermined position by performing the projective transformation on the selection image 623a.

In the next step S625, the complementary image generation unit 625 of the image processing unit 62 generates the complementary image 625a by extracting an image of a region in the projective transformation image (fifth image) 624a corresponding to the mask region.

In the next step S626, the image superimposition unit 626 of the image processing unit 62 generates a synthetic display image 626a by superimposing the complementary image 625a on the mask region 51 in the first image 31.

The image output unit 13 outputs the synthetic display image 626a generated by the image processing unit 62 to the display device 100 without change or after converting the signal format. The display device 100 displays the display image including the image of the dead region on the screen.

As described above, with the image processing device 6 and the monitoring system according to the sixth embodiment, the synthetic display image in which the dead region 60 has been replaced with the complementary image can be displayed on one screen of the display device 100. Accordingly, the condition of the image capture region can be grasped easily and correctly compared to cases where the image of the dead region is displayed on a different screen.

Further, in the sixth embodiment, the second images are modified by using the previously stored reference images, and thus the quality of the synthetic display image can be improved without increasing the data processing load.

(7) Seventh Embodiment

Figure 19:
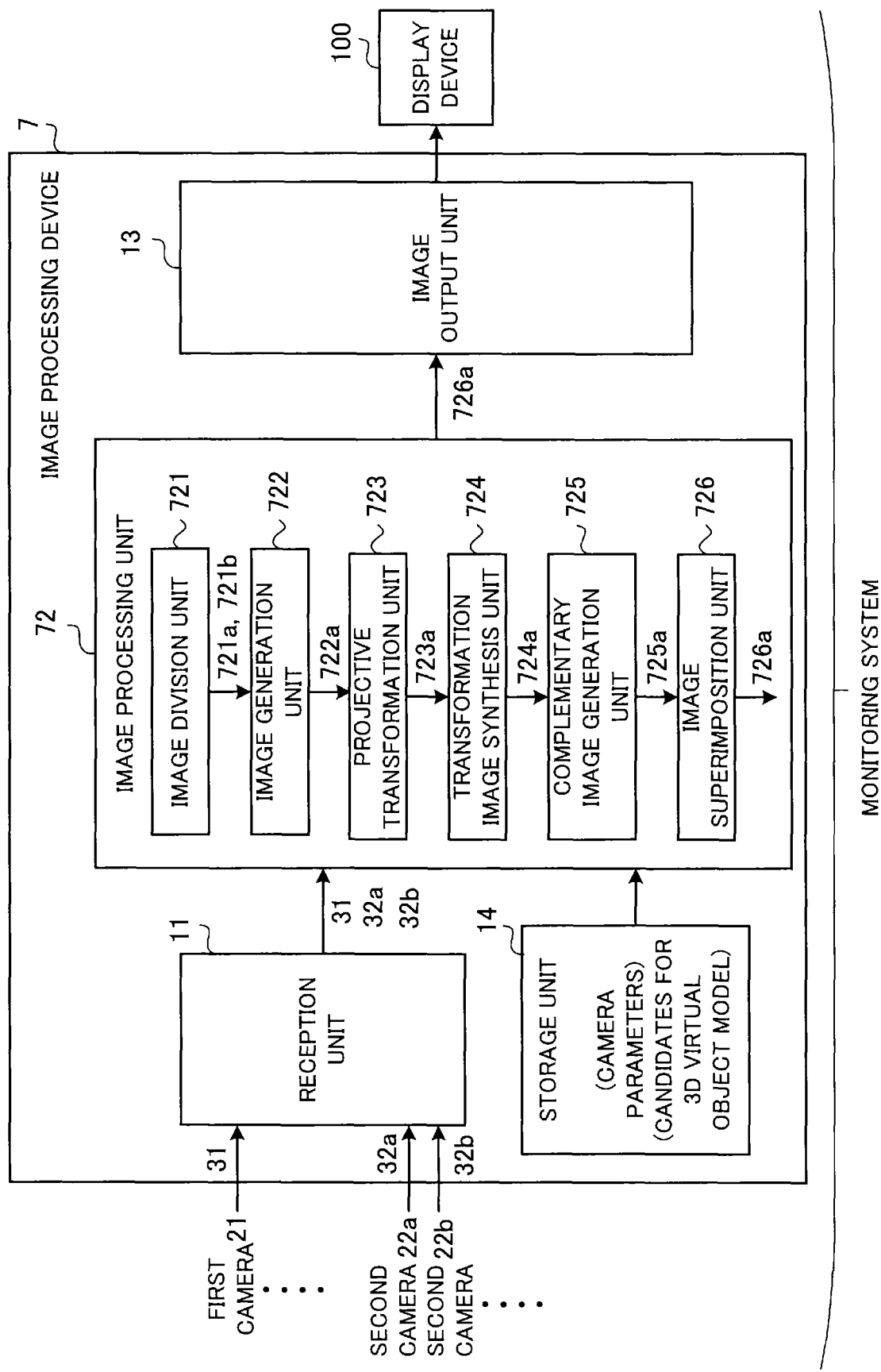
FIG. 19 is a functional block diagram schematically showing an image processing device and a monitoring system according to a seventh embodiment of the present invention.

FIG. 19 is a functional block diagram schematically showing an image processing device 7 according to a seventh embodiment. In FIG. 19, each component identical or corresponding to a component shown in FIG. 1 is assigned the same reference character as in FIG. 1. As shown in FIG. 19, the monitoring system includes at least one first camera 21, a plurality of second cameras 22a and 22b, the image processing device 7 and the display device 100. The image processing device 7 includes the reception unit 11, an image processing unit 72, the image output unit 13, and the storage unit 14 that stores the camera parameter information and candidates for a three-dimensional (represented also as "3D") virtual object model. The 3D virtual object model is image data of a shape similar to a previously existing object. The object is, for example, a person, a vehicle, an animal, equipment or the like. The image processing unit 72 includes an image division unit 721, an image generation unit 722, a projective transformation unit 723, a transformation image synthesis unit 724, a complementary image generation unit 725 and an image superimposition unit 726.

The seventh embodiment differs from the first embodiment in executing a process of dividing each of the second images 32a and 32b into a foreground image part 721a indicating the object and a background image part 721b other than the foreground image part 721a and replacing the foreground image part with a previously stored 3D virtual object model. In regard to other features, the seventh embodiment is the same as the first embodiment. The 3D virtual object model can be data obtained by texture-mapping an image of a foreground image of a second camera onto a 3D virtual object model. This makes it possible to grasp not only the position and posture of the object but also the condition of the surface of the object.

Figure 20:
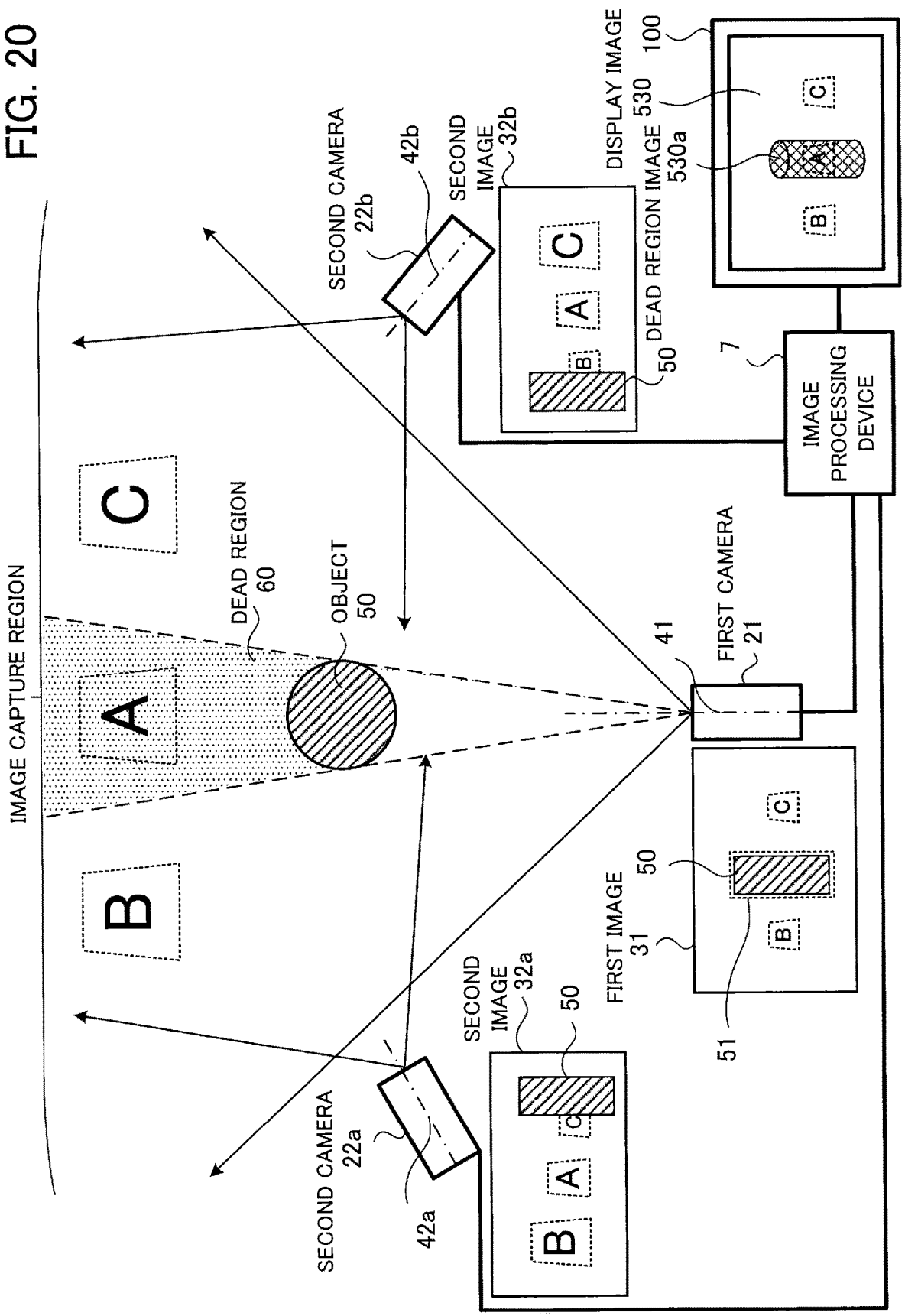
FIG. 20 is an explanatory drawing showing the operation of the image processing device and the monitoring system according to the seventh embodiment.

FIG. 20 is an explanatory drawing showing the operation of the image processing device 7 and the monitoring system according to the seventh embodiment. In FIG. 20, each component identical or corresponding to a component shown in FIG. 2 or FIG. 11 is assigned the same reference character as in FIG. 2 or FIG. 11. In the example of FIG. 20, the display device 100 displays a display image 530 including a dead region image 530a generated based on the 3D virtual object model.

Figure 21:
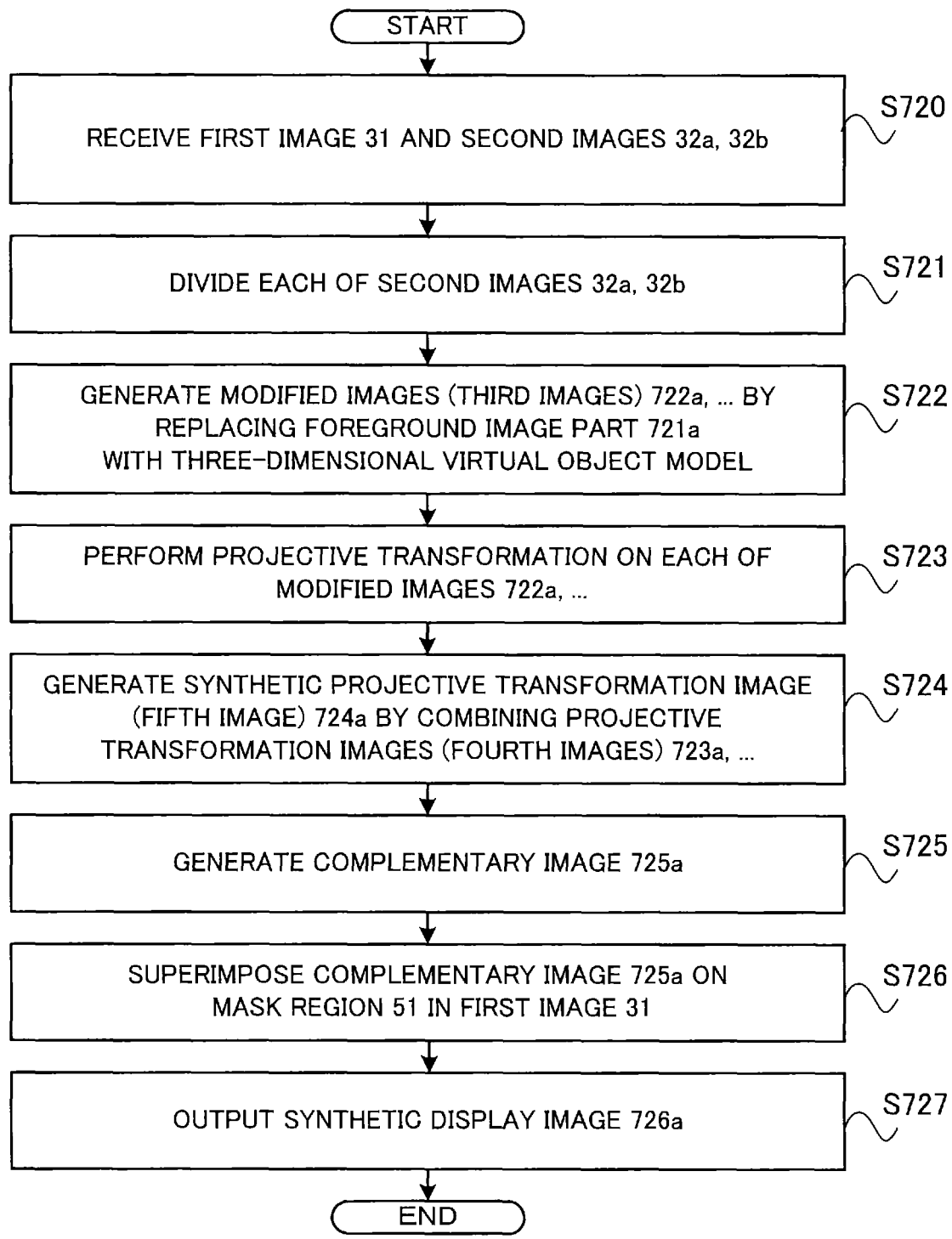
FIG. 21 is a flowchart showing an operation example of the image processing device according to the seventh embodiment.

FIG. 21 is a flowchart showing an operation example of the image processing device 7 according to the seventh embodiment. First, in step S720, the reception unit 11 of the image processing device 7 receives the first image 31 and the second images 32a and 32b.

In the next step S721, the image division unit 721 of the image processing unit 72 divides each of the second images 32a and 32b into the foreground image part 721a occupied by the object 50 and the background image part 721b other than the foreground image part 721a.

In the next step S722, the image generation unit 722 of the image processing unit 72 generates a plurality of modified images (third images) 722a, . . . from the second images 32a and 32b by replacing the foreground image part 721a with the 3D virtual object model. The 3D virtual object model is arranged in appropriate scale, position and posture.

In the next step S723, the projective transformation unit 723 of the image processing unit 72 generates a plurality of projective transformation images (fourth images) 723a, . . . as viewed from a predetermined position by performing the projective transformation on each of the plurality of modified images 722a, . . . . The predetermined position is, for example, the position of the first camera 21, or desired to be a position on the optical axis of the first camera 21.

In the next step S724, the transformation image synthesis unit 724 of the image processing unit 72 generates a synthetic projective transformation image (fifth image) 724*a* by combining the plurality of projective transformation images 723*a*, . . . .

In the next step S725, the complementary image generation unit 725 of the image processing unit 72 generates a complementary image 725*a* by extracting an image of a region in the synthetic projective transformation image 724*a* corresponding to the mask region.

In the next step S726, the image superimposition unit 726 of the image processing unit 72 generates a synthetic display image 726*a* by superimposing the complementary image 725*a* on the mask region 51 in the first image 31. The superimposition can be the blend process taking into account the transparency of each image.

The image output unit 13 outputs the synthetic display image 726*a* to the display device 100. The display device 100 displays the display image (530 in FIG. 20), in which the inside of the mask region 51 has been replaced with the dead region image (530*a* in FIG. 20) based on the complementary image 725*a*, on the screen.

As described above, with the image processing device 7 and the monitoring system according to the seventh embodiment, the synthetic display image in which the dead region 60 has been replaced with the complementary image can be displayed on one screen of the display device 100. Accordingly, the condition of the image capture region can be grasped easily and correctly compared to cases where the dead region image 530*a* is displayed on a different screen.

Further, in the seventh embodiment, the second images are modified by using the previously stored 3D virtual object model, and thus the quality of the synthetic display image can be improved without increasing the data processing load. Furthermore, the method in this embodiment is effective in cases where the occupancy ratio of the foreground image in the image captured by the second camera is high since distortion of the foreground image after undergoing the projective transformation stands out.

(8) Eighth Embodiment

Figure 22:
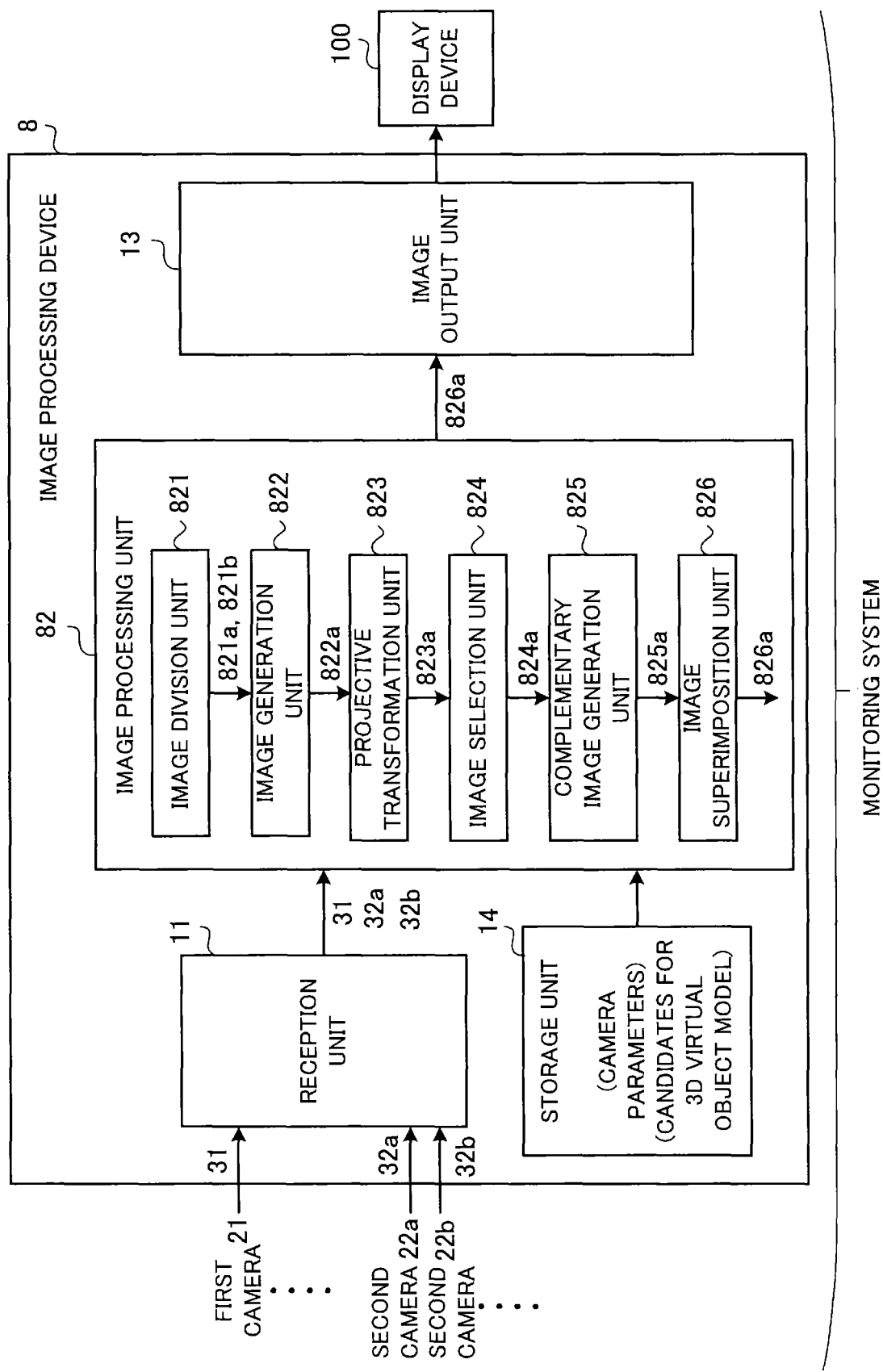
FIG. 22 is a functional block diagram schematically showing an image processing device and a monitoring system according to an eighth embodiment of the present invention.

FIG. 22 is a functional block diagram schematically showing an image processing device 8 and a monitoring system according to an eighth embodiment. In FIG. 22, each component identical or corresponding to a component shown in FIG. 19 is assigned the same reference character as in FIG. 19. As shown in FIG. 22, the image processing device 8 includes the reception unit 11, an image processing unit 82, the image output unit 13 and the storage unit 14. The image processing unit 82 includes an image division unit 821, an image generation unit 822, a projective transformation unit 823, an image selection unit 824, a complementary image generation unit 825 and an image superimposition unit 826.

In the seventh embodiment, the complementary image 725*a* is generated by using the synthetic projective transformation image 724*a* of the second images 32*a* and 32*b*. In the eighth embodiment, one of the second images 32*a* and 32*b* is selected and a complementary image 825*a* is generated by using a selection image 824*a*. Except for this feature, the eighth embodiment is the same as the seventh embodiment.

Figure 23:
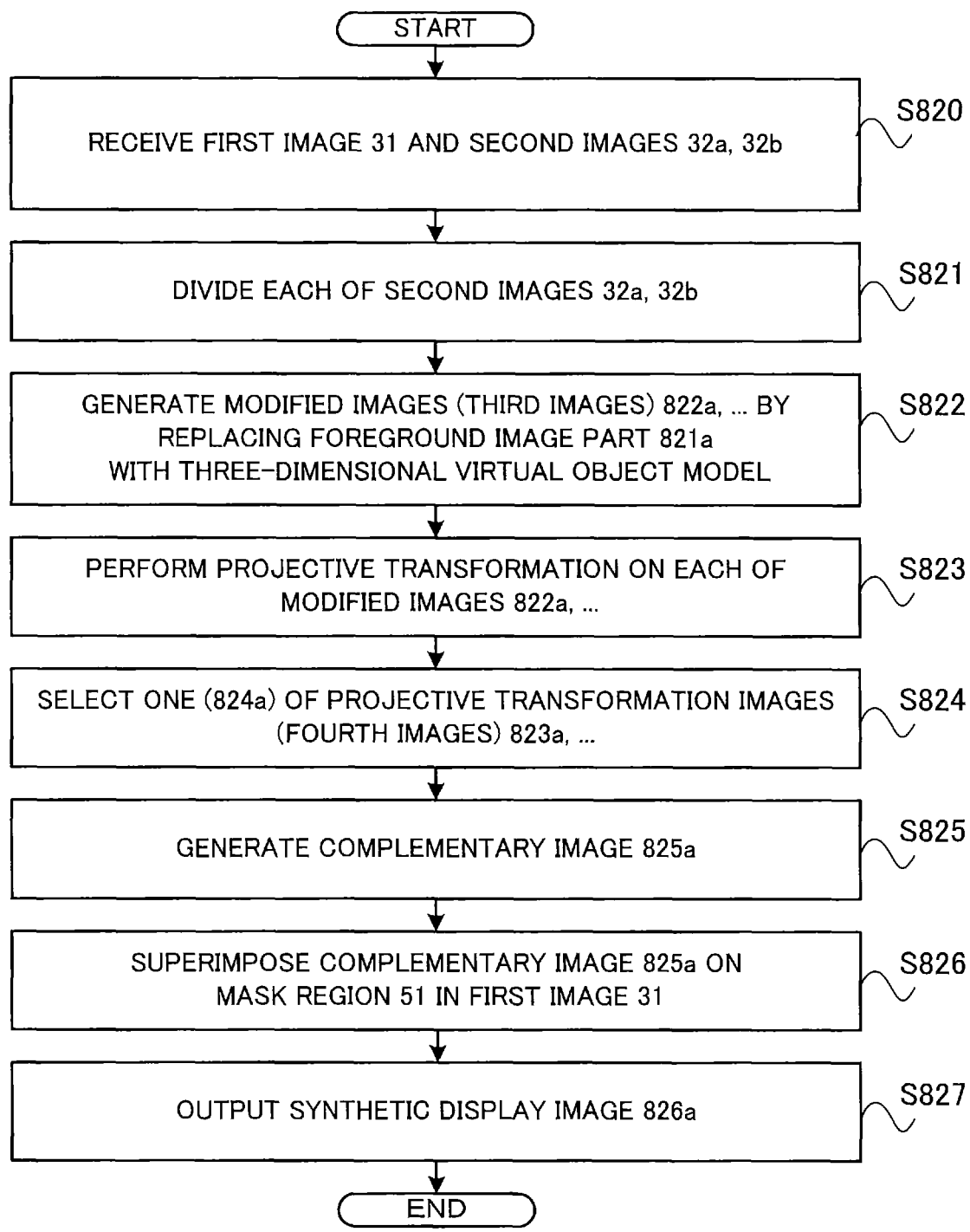
FIG. 23 is a flowchart showing an operation example of the image processing device according to the eighth embodiment.

FIG. 23 is a flowchart showing an operation example of the image processing device 8 according to the eighth embodiment. First, in step S820, the reception unit 11 of the image processing device 8 receives the first image 31 and the second images 32*a* and 32*b*.

In the next step S821, the image division unit 821 of the image processing unit 82 divides each of the second images 32*a* and 32*b* into a foreground image part 821*a* occupied by the object 50 and a background image part 821*b* other than the foreground image part 821*a*.

In the next step S822, the image generation unit 822 of the image processing unit 82 generates a plurality of modified images (third images) 822*a*, . . . by replacing the foreground image part 821*a* with an image of the 3D virtual object model.

In the next step S823, the projective transformation unit 823 of the image processing unit 82 generates a plurality of projective transformation images (fourth images) 823*a*, . . . as viewed from a predetermined position by performing the projective transformation on each of the plurality of modified images 822*a*, . . . .

In the next step S824, the image selection unit 824 of the image processing unit 82 selects the selection image (fifth image) 824*a*, capable of providing a partial region that minimizes the energy of pixels at the boundary of the mask region when the partial region of each of the plurality of projective transformation images 823*a*, . . . is arranged in the mask region, from the plurality of projective transformation images 823*a*, . . . .

In the next step S825, the complementary image generation unit 825 of the image processing unit 82 generates the complementary image 825*a* by extracting an image of a region in the selection image 824*a* corresponding to the mask region.

In the next step S826, the image superimposition unit 826 of the image processing unit 82 generates a synthetic display image 826*a* by superimposing the complementary image 825*a* on the mask region 51 in the first image 31.

The image output unit 13 outputs the synthetic display image 826*a* generated by the image processing unit 82 to the display device 100 without change or after converting the signal format. The display device 100 displays the display image including the image of the dead region on the screen.

As described above, with the image processing device 8 and the monitoring system according to the eighth embodiment, the synthetic display image in which the dead region 60 has been replaced with the complementary image can be displayed on one screen of the display device 100. Accordingly, the condition of the image capture region can be grasped easily and correctly compared to cases where the image of the dead region is displayed on a different screen.

Further, in the eighth embodiment, the second images are modified by using an image of the previously stored 3D virtual object model, and thus the quality of the synthetic display image can be improved without increasing the data processing load.

(9) Ninth Embodiment

Figure 24:
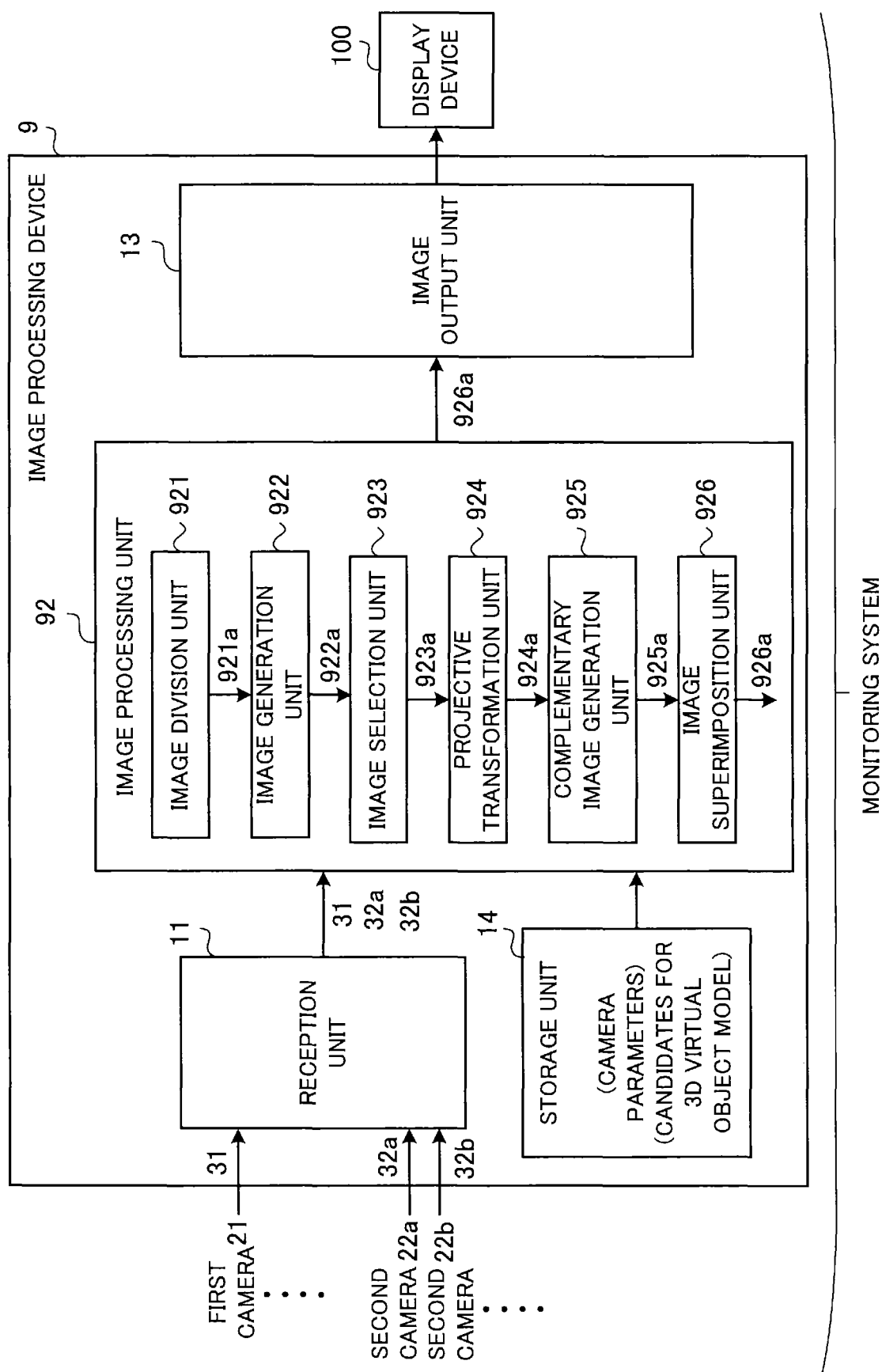
FIG. 24 is a functional block diagram schematically showing an image processing device and a monitoring system according to a ninth embodiment of the present invention.

FIG. 24 is a functional block diagram schematically showing an image processing device 9 and a monitoring system according to a ninth embodiment. In FIG. 24, each component identical or corresponding to a component shown in FIG. 19 or FIG. 22 is assigned the same reference character as in FIG. 19 or FIG. 22. As shown in FIG. 24, the image processing device 9 includes the reception unit 11, an image processing unit 92, the image output unit 13 and the storage unit 14. The image processing unit 92 includes an image division unit 921, an image generation unit 922, an image selection unit 923, a projective transformation unit 924, a complementary image generation unit 925 and an image superimposition unit 926.

In the seventh embodiment, the complementary image 725a is generated by using the synthetic projective transformation image 724a of the second images 32a and 32b. In the ninth embodiment, one of the second images 32a and 32b is selected and a complementary image 925a is generated by using a selection image 923a as the selected second image. Except for this feature, the ninth embodiment is the same as the seventh embodiment.

Figure 25:
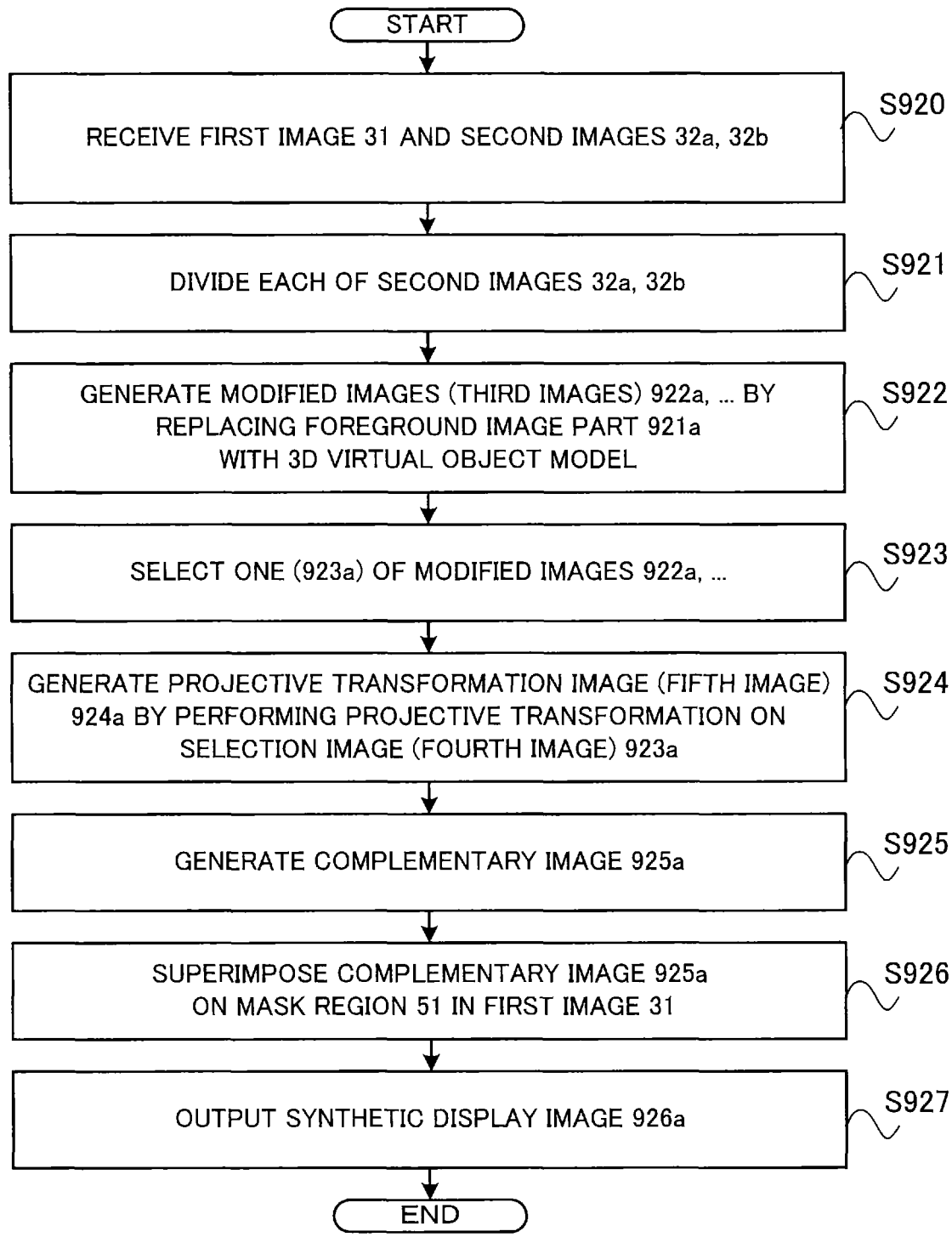
FIG. 25 is a flowchart showing an operation example of the image processing device according to the ninth embodiment.

FIG. 25 is a flowchart showing an operation example of the image processing device 9 according to the ninth embodiment. First, in step S920, the reception unit 11 of the image processing device 9 receives the first image 31 and the second images 32a and 32b.

In the next step S921, the image division unit 921 of the image processing unit 92 divides each of the second images 32a and 32b into a foreground image part 921a occupied by the object 50 and a background image part 921b other than the foreground image part 921a.

In the next step S922, the image generation unit 922 of the image processing unit 92 generates a plurality of modified images (third images) 922a, . . . from the second images 32a and 32b by replacing the foreground image part 921a with an image of the 3D virtual object model.

In the next step S923, the image selection unit 923 of the image processing unit 92 selects the selection image 923a (fourth image), captured by the second camera 22a or 22b having the optical axis 42a or 42b in a direction closer to the direction of the optical axis 41 of the first camera 21, from the plurality of modified images 922a, . . . .

In the next step S924, the projective transformation unit 924 of the image processing unit 92 generates a projective transformation image (fifth image) 924a as viewed from a predetermined position by performing the projective transformation on the selection image 923a.

In the next step S925, the complementary image generation unit 925 of the image processing unit 92 generates the complementary image 925a by extracting an image of a region in the projective transformation image (fifth image) 924a corresponding to the mask region.

In the next step S926, the image superimposition unit 926 of the image processing unit 92 generates a synthetic display image 926a by superimposing the complementary image 925a on the mask region 51 in the first image 31.

The image output unit 13 outputs the synthetic display image 926a generated by the image processing unit 92 to the display device 100 without change or after converting the signal format. The display device 100 displays the display image including the dead region image on the screen.

As described above, with the image processing device 9 and the monitoring system according to the ninth embodiment, the synthetic display image in which the dead region 60 has been replaced with the complementary image can be displayed on one screen of the display device 100. Accordingly, the condition of the image capture region can be grasped easily and correctly compared to cases where the image of the dead region is displayed on a different screen.

Further, in the ninth embodiment, the second images are modified by using the image of the previously stored 3D virtual object model, and thus the quality of the synthetic display image can be improved without increasing the data processing load.

(10) Modification

Figure 26:
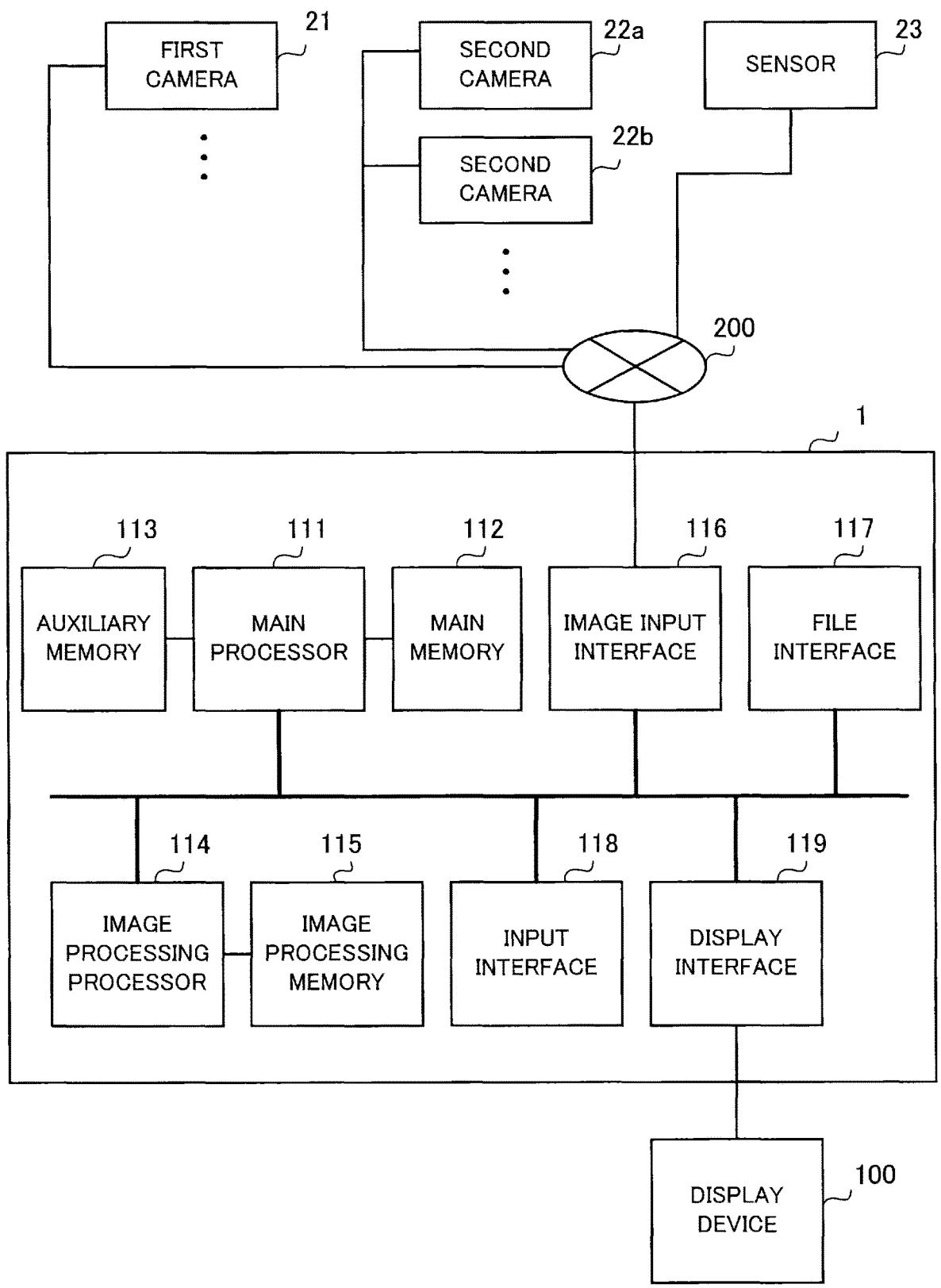
FIG. 26 is a diagram showing an example of a hardware configuration of the image processing device according to each of the first to ninth embodiments.

FIG. 26 is a diagram showing an example of the hardware configuration of the monitoring system according to each of the first to ninth embodiments. In the example of FIG. 26, the monitoring system includes the image processing device 1, the first camera 21 and the second cameras 22a and 22b connected to the image processing device 1 via a network 200, a sensor 23 that detects the position of an object, and the display device 100.

The image processing device 1 includes a main processor 111, a main memory 112, an auxiliary memory 113, an image processing processor 114, an image processing memory 115, an input interface 118, a file interface 117, a display interface 119 and an image input interface 116. The image processing processor 114 is, for example, a parallel arithmetic device such as a Graphics Processing Unit (GPU). The auxiliary memory 113 stores the camera parameter information (including the lens distortion correction maps and the like) obtained by the camera calibration process performed previously. The main processor 111 loads information stored in the main memory 112 via the file interface 117. Image data of the 3D virtual object model and data of texture are stored in the auxiliary memory 113.

The input interface 118 receives a device input such as a mouse input, a keyboard input or a touch panel input and supplies the result of the input to the main memory 112. The image processing memory 115 stores input images transferred from the main memory 112 and synthetic images generated by the image processing processor 114. The display interface 119 outputs the synthetic display image to the display device 100 connected by using a High-Definition Multimedia Interface (HDMI) (registered trademark) cable or the like. The image input interface 116 receives image inputs from the first cameras 21, . . . and the second cameras 22a, 22b, . . . and stores the input images in the main memory 112. The first cameras 21, . . . and the second cameras 22a, 22b, . . . can be, for example, network cameras, analog cameras, Universal Serial Bus (USB) cameras, High Definition Serial Digital Interface (HD-SDI) cameras, or the like. The sensor 23 is, for example, a radar, a laser scanner, or the like.

The image processing processor 114 is capable of implementing the functions of the image processing unit in each of the image processing devices 1 to 9 in the first to ninth embodiments by executing an image processing program stored in the main memory 112.

DESCRIPTION OF REFERENCE CHARACTERS 1-9: image processing device, 11: reception unit, 12, 22, 32, 42, 52, 62, 72, 82, 92: image processing unit, 13: image output unit, 14: storage unit, 21: first camera, 22a, 22b: second camera, 31: first image, 32a, 32b: second image, 41, 42a, 42b: optical axis, 50: object, 51: mask region, 60: dead region, 100: display device, 124a, 224a, 324a, 426a, 526a, 626a, 726a, 826a, 926a: synthetic display image, 130, 430, 530: display image, 130a, 430a, 530a: dead region image.

What is claimed is:

1. An image processing device comprising:
a processor to execute a program; and
a memory to store the program which, when executed by the processor, performs processes of,
receiving at least one first image provided from at least one first camera capturing an image of a region in which an object exists and a plurality of second images provided from a plurality of second cameras capturing images of a region including a dead region hidden by the object and invisible from a position of the first camera; and
generating a complementary image, as an image of a mask region in the at least one first image corresponding to the object, from the plurality of second images and generating a synthetic display image by combining the at least one first image and the complementary image,
wherein the generating the complementary image includes:
a process of generating a plurality of third images as viewed from a predetermined position by performing projective transformation on the plurality of second images;
a process of selecting a third image, capable of providing a partial region that minimizes energy of pixels at a boundary of the mask region when the partial region of each of the plurality of third images is arranged in the mask region, from the plurality of third images and a process of outputting the selected image as a fourth image; and
a process of generating the complementary image by extracting an image of a region in the fourth image corresponding to the mask region.

2. The image processing device according to claim 1, wherein the synthetic display image is generated by superimposing the complementary image on the mask region in each of the at least one first image or by superimposing the complementary image on a synthetic image generated from the at least one first image.

3. The image processing device according to claim 1, wherein the memory previously stores reference images as the plurality of second images captured previously by the plurality of second cameras, and
the generating the complementary image includes:
a process of dividing each of the plurality of second images into a foreground image part occupied by the object and a background image part other than the foreground image part;
a process of generating a plurality of third images from the plurality of second images by replacing the foreground image part with an image as a part of the reference image;
a process of generating a plurality of fourth images as viewed from a predetermined position by performing projective transformation on the plurality of third images;
a process of selecting a fourth image, capable of providing a partial region that minimizes energy of pixels at a boundary of the mask region when the partial region of each of the plurality of fourth images is arranged in the mask region, from the plurality of fourth images and a process of outputting the selected image as a fifth image; and
a process of generating the complementary image by extracting an image of a region in the fifth image corresponding to the mask region.

4. The image processing device according to claim 1, wherein the memory previously stores image data of candidates for a three-dimensional virtual object model, and
the generating the complementary image includes:
a process of dividing each of the plurality of second images into a foreground image part occupied by the object and a background image part other than the foreground image part;
a process of selecting a three-dimensional virtual object model corresponding to the object from the candidates for the three-dimensional virtual object model and a process of generating a plurality of third images from the plurality of second images by replacing the foreground image part with the three-dimensional virtual object model;
a process of generating a plurality of fourth images as viewed from a predetermined position by performing projective transformation on the plurality of third images;
a process of selecting a fourth image, capable of providing a partial region that minimizes energy of pixels at a boundary of the mask region when the partial region of each of the plurality of fourth images is arranged in the mask region, from the plurality of fourth images and a process of outputting the selected image as a fifth image; and
a process of generating the complementary image by extracting an image of a region in the fifth image corresponding to the mask region.

5. An image processing method comprising:
receiving at least one first image provided from at least one first camera capturing an image of a region in which an object exists and a plurality of second images provided from a plurality of second cameras capturing images of a region including a dead region hidden by the object and invisible from a position of the first camera; and
generating a complementary image, as an image of a mask region in the at least one first image corresponding to the object, from the plurality of second images and generating a synthetic display image by combining the at least one first image and the complementary image,
wherein generating the complementary image includes:
generating a plurality of third images as viewed from a predetermined position by performing projective transformation on the plurality of second images;
selecting a third image, capable of providing a partial region that minimizes energy of pixels at a boundary of the mask region when the partial region of each of the plurality of third images is arranged in the mask region, from the plurality of third images and outputting the selected image as a fourth image; and
generating the complementary image by extracting an image of a region in the fourth image corresponding to the mask region.

6. A monitoring system comprising:
at least one first camera capturing images an image of a region in which an object exists;
a plurality of second cameras capturing images of a region including a dead region invisible from a position of the first camera due to the object;
an image processing device to receive at least one first image provided from the at least one first camera and a plurality of second images provided from the plurality of second cameras, to generate a complementary image, as an image of a mask region in the at least one first image corresponding to the object, from the plurality of second images, and to generate a synthetic display image by combining the at least one first image and the complementary image; and
a display device that displays an image based on the synthetic display image-,
wherein the image processing device generates a plurality of third images as viewed from a predetermined position by performing projective transformation on the plurality of second images, selects a third image, capable of providing a partial region that minimizes energy of pixels at a boundary of the mask region when the partial region of each of the plurality of third images is arranged in the mask region, from the plurality of third images, outputs the selected image as a fourth image, and generates the complementary image by extracting an image of a region in the fourth image corresponding to the mask region.

* * * * *